(12) United States Patent
Sugiura et al.

(10) Patent No.: US 8,146,426 B2
(45) Date of Patent: Apr. 3, 2012

(54) PHYSICAL SENSOR

(75) Inventors: Kazuhiko Sugiura, Nagoya (JP);
Yoshihiko Isobe, Toyoake (JP)

(73) Assignee: DENSO CORPORATION, Kariya (JP)

( * ) Notice: Subject to any disclaimer, the term of this patent is extended or adjusted under 35 U.S.C. 154(b) by 571 days.

(21) Appl. No.: 12/318,186

(22) Filed: Dec. 23, 2008

(65) Prior Publication Data

US 2009/0199637 A1 Aug. 13, 2009

(30) Foreign Application Priority Data

Feb. 13, 2008 (JP) .................................. 2008-31703
Sep. 26, 2008 (JP) ................................ 2008-247768

(51) Int. Cl.
*G01P 15/125* (2006.01)
*G01P 9/04* (2006.01)
*G01C 19/56* (2006.01)

(52) U.S. Cl. .................. 73/514.32; 73/504.14
(58) Field of Classification Search ............... 73/514.32, 73/514.29, 514.36, 514.38, 504.12, 504.14
See application file for complete search history.

(56) References Cited

U.S. PATENT DOCUMENTS

| | | | | |
|---|---|---|---|---|
| 5,495,761 A * | 3/1996 | Diem et al. | ................. | 73/514.32 |
| 5,576,250 A | 11/1996 | Diem et al. | | |
| 5,616,523 A | 4/1997 | Benz et al. | | |
| 5,780,885 A | 7/1998 | Diem et al. | | |
| 5,894,091 A | 4/1999 | Kubota | | |
| 6,223,598 B1 * | 5/2001 | Judy | ........................... | 73/514.32 |
| 6,492,070 B1 | 12/2002 | Kobinata | | |
| 6,631,642 B2 | 10/2003 | Oguchi et al. | | |
| 6,668,614 B2 * | 12/2003 | Itakura | ........................... | 73/1.38 |
| 6,759,591 B2 * | 7/2004 | Yoshida et al. | ................ | 174/520 |
| 6,953,753 B2 * | 10/2005 | Oohara et al. | ................. | 438/719 |
| 6,990,864 B2 * | 1/2006 | Sakai | ......................... | 73/514.32 |
| 7,267,006 B2 * | 9/2007 | Malvern | ..................... | 73/514.32 |
| 7,270,003 B2 * | 9/2007 | Sassolini et al. | ........... | 73/514.32 |
| 7,293,460 B2 * | 11/2007 | Zarabadi et al. | ........... | 73/514.32 |
| 7,418,864 B2 * | 9/2008 | Asami et al. | ................ | 73/514.32 |
| 7,469,588 B2 * | 12/2008 | LaFond et al. | .............. | 73/514.32 |
| 7,554,340 B2 * | 6/2009 | Furukubo et al. | ............. | 324/661 |
| 7,690,254 B2 * | 4/2010 | Pilchowski et al. | ........ | 73/514.32 |
| 2002/0158293 A1 | 10/2002 | Lee et al. | | |

(Continued)

FOREIGN PATENT DOCUMENTS

JP A-11-220138 8/1999

(Continued)

OTHER PUBLICATIONS

Notice of Reason for Refusal mailed on Feb. 16, 2010 issued from the Japanese Patent Office in the corresponding Japanese patent application No. 2008-247768 (with English translation).

*Primary Examiner* — Helen C. Kwok
(74) *Attorney, Agent, or Firm* — Posz Law Group, PLC

(57) ABSTRACT

A physical sensor includes: a substrate having a silicon layer, an oxide film and a support layer; and a sensor portion having movable and fixed electrodes and a lower electrode. The movable electrode is supported by a beam on the support layer. The fixed electrode faces the movable electrode. The lower electrode is disposed on the support layer and faces the movable electrode. The physical sensor detects horizontal physical quantity based on a capacitance between the movable and fixed electrodes, and vertical physical quantity based on a capacitance between the movable and lower electrodes. The beam includes vertical and horizontal beams. The thickness of the vertical beam is smaller than the thickness of the horizontal beam.

10 Claims, 13 Drawing Sheets

U.S. PATENT DOCUMENTS

| | | |
|---|---|---|
| 2004/0053507 A1 | 3/2004 | Okuda et al. |
| 2006/0213268 A1 | 9/2006 | Asami et al. |

FOREIGN PATENT DOCUMENTS

| | | |
|---|---|---|
| JP | A-2001-274234 | 10/2001 |
| JP | A-2003-46091 | 2/2003 |
| JP | A-2003-329704 | 11/2003 |
| JP | A-2004-93494 | 3/2004 |
| JP | A-2005-349533 | 12/2005 |
| JP | A-2006-308352 | 11/2006 |
| JP | A-2007-298385 | 11/2007 |

* cited by examiner

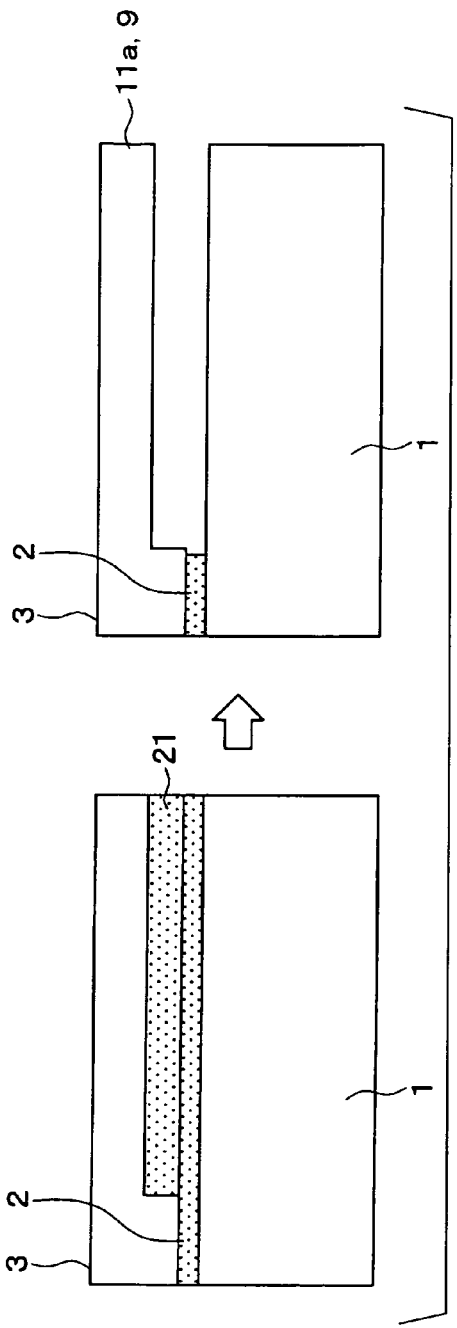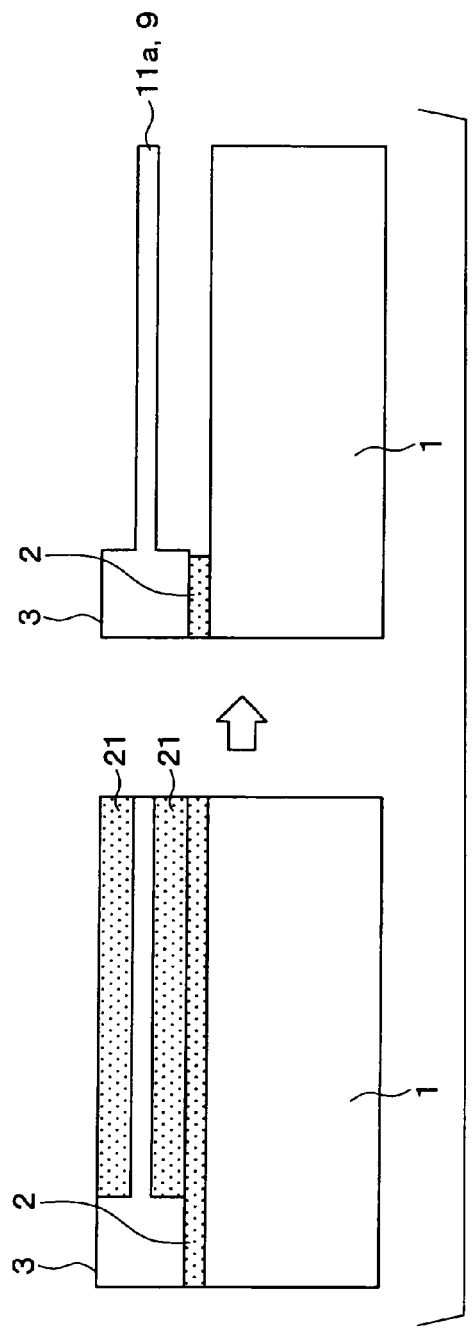

PHYSICAL SENSOR

CROSS REFERENCE TO RELATED APPLICATIONS

This application is based on Japanese Patent Applications No. 2008-31703 filed on Feb. 13, 2008, and No. 2008-247768 filed on Sep. 26, 2008, the disclosures of which are incorporated herein by reference.

FIELD OF THE INVENTION

The present invention relates to a physical sensor for detecting a physical quantity based on a capacitance between a movable electrode and a fixed electrode.

BACKGROUND OF THE INVENTION

A conventional physical sensor includes a fixed section and a movable section supported by a beam structure on a substrate. The movable section moves relatively to the fixed section in accordance with application of a physical quantity such as an acceleration or an angular velocity. Using this mechanism, the physical sensor detects the applied physical quantity.

For example, in the method proposed in Patent Document 1, the movable section is formed as follows. An oxide-film sacrifice layer is sandwiched between upper and lower single-crystal layers for bonding. A groove is formed on the upper layer so as to reach the sacrifice layer. The sacrifice layer is etched through the groove. Similarly, Patent Document 2 discloses the multilayer laminate structure including multiple sacrifice layers. A beam structure is formed by removing the sacrifice layers.

Patent Document 3 proposes the technique to etch the surface of a beam or a movable section from the substrate surface by a prescribed quantity. The technique aims at adjusting the thickness of the beam or the movable section of a physical sensor that detects physical quantities applied from different directions on one semiconductor substrate. Patent Document 4 proposes the technique to configure a beam as follows. Hydrogen ion is injected at a position for forming a hollow region in the silicon. A heat process is then conducted to delaminate the position injected with the hydrogen and form a hollow region.

Patent Document 5 proposes the technique to control a torsion bar thickness as follows. An oxide film is embedded in a semiconductor substrate. The surface of the semiconductor substrate embedded with an insulating film is bonded to another semiconductor substrate. The oxide film embedded in the semiconductor substrate is used as a mask to etch the semiconductor substrate. A torsion bar is formed so as to be integral with the semiconductor substrate.

Patent Document 1: IP-A-6-349806 corresponding to U.S. Pat. No. 5,616,523
Patent Document 2: IP-A-2003-46091
Patent Document 3: IP-A-2004-93494
Patent Document 4: IP-A-2005-349533
Patent Document 5: IP-A-2004-106116 corresponding to US 2004/0053507

The above-mentioned physical sensor determines a sensor characteristic based on characteristics such as a spring constant for the beam. It is important to consider a beam size. For example, there may be a multi-axis sensor for detecting physical quantities at least in two directions in such a manner that a beam deflects parallel to and perpendicularly to the substrate surface. It is important to consider a spring constant for the beam dependent on the beam width in the direction parallel to the substrate surface and a spring constant and a beam height dependent on the beam thickness in the direction perpendicular to the substrate surface.

The techniques described in the above-mentioned patent documents inevitably determine the beam thickness and therefore the spring characteristic for the beam. Accordingly, the beam thickness is constant in the direction parallel to the substrate surface and in the direction perpendicular to the substrate surface. It is difficult to provide a structure that features an intended spring characteristic in each direction.

SUMMARY OF THE INVENTION

In view of the above-described problem, it is an object of the present disclosure to provide a physical sensor for detecting a physical quantity based on a capacitance between a movable electrode and a fixed electrode.

According to a first aspect of the present disclosure, a physical sensor for detecting a physical quantity includes: a substrate including a silicon layer, an oxide film and a support layer, which are stacked in this order; and a sensor portion includes a movable portion, a fixed portion and a lower electrode, wherein the movable portion and the fixed portion are disposed in the silicon layer, the movable portion includes a movable electrode, which is supported by a beam on the support layer, the fixed portion includes a fixed electrode facing the movable electrode, the lower electrode is disposed on the support layer, and the lower electrode faces the movable electrode via a space without the oxide film. The physical sensor detects the physical quantity along with a first direction parallel to the substrate based on a capacitance between the movable electrode and the fixed electrode. The physical sensor detects the physical quantity along with a second direction perpendicularly to the substrate based on a capacitance between the movable electrode and the lower electrode. The beam includes a vertical beam displaceable along with the second direction and a horizontal beam displaceable along with the first direction. The vertical beam has a thickness in the second direction, and the horizontal beam has a thickness in the second direction. The thickness of the vertical beam is smaller than the thickness of the horizontal beam.

The vertical beam and the horizontal beam are formed with different thicknesses. A spring characteristic of the vertical beam can differ from a spring constant of the horizontal beam. The beams can be individually assigned intended values. The height of the vertical beam is independent of the thickness of the oxide film since the silicon layer is removed at the bottom near the support substrate. The spring characteristic can be more improved. A physical quantity can be detected perpendicularly to the substrate based on deflection of the vertical beam having an improved spring characteristic. In addition, a physical quantity can be detected parallel to the substrate based on deflection of the horizontal beam having an improved spring characteristic.

According to a second aspect of the present disclosure, a physical sensor for detecting a physical quantity includes: a substrate including a silicon layer, an oxide film and a support layer, which are stacked in this order, wherein the silicon layer includes a lower layer, an insulation film and an upper layer, and the lower layer is disposed on the oxide film; and a sensor portion includes a movable portion, a fixed portion and a lower electrode, wherein the movable portion and the fixed portion are disposed in the upper layer of the silicon layer, the movable portion includes a movable electrode, which is supported by a beam on the support layer, the fixed portion includes a fixed electrode facing the movable electrode, the lower electrode is disposed on the support layer, and the lower electrode faces the movable electrode via a space without the oxide film. The physical sensor detects the physical quantity along with a first direction parallel to the substrate based on a capacitance between the movable electrode and the fixed electrode. The physical sensor detects the physical quantity along with a second direction perpendicularly to the substrate based on a capacitance between the movable electrode and the lower electrode. The beam includes a vertical beam displaceable along with the second direction and a horizontal beam displaceable along with the first direction. The vertical beam has a thickness in the second direction, and the horizontal beam has a thickness in the second direction, and the thickness of the vertical beam is smaller than the thickness of the horizontal beam.

In the above sensor, a spring characteristic of the vertical beam can differ from a spring constant of the horizontal beam. Thus, the beams can be individually assigned intended values. A physical quantity can be detected perpendicularly to the substrate based on deflection of the vertical beam having an improved spring characteristic. In addition, a physical quantity can be detected parallel to the substrate based on deflection of the horizontal beam having an improved spring characteristic.

According to a third aspect of the present disclosure, a physical sensor for detecting a physical quantity includes: a substrate including a silicon layer, an oxide film and a support layer, which are stacked in this order; and a sensor portion includes a movable portion, a fixed portion and an upper electrode, wherein the movable portion and the fixed portion are disposed in the silicon layer, the movable portion includes a movable electrode, which is supported by a beam on the support layer, the fixed portion includes a fixed electrode facing the movable electrode, the upper electrode is spaced apart from the movable electrode by a predetermined distance, and the upper electrode is disposed opposite to the lower electrode. The physical sensor detects the physical quantity along with a first direction parallel to the substrate based on a capacitance between the movable electrode and the fixed electrode. The physical sensor detects the physical quantity along with a second direction perpendicularly to the substrate based on a capacitance between the movable electrode and the upper electrode. The beam includes a vertical beam displaceable along with the second direction and a horizontal beam displaceable along with the first direction. The vertical beam has a thickness in the second direction, and the horizontal beam has a thickness in the second direction, and the thickness of the vertical beam is smaller than the thickness of the horizontal beam.

In the above sensor, a spring characteristic of the vertical beam can differ from a spring constant of the horizontal beam. Thus, the beams can be individually assigned intended values. A physical quantity can be detected perpendicularly to the substrate based on deflection of the vertical beam having an improved spring characteristic. In addition, a physical quantity can be detected parallel to the substrate based on deflection of the horizontal beam having an improved spring characteristic.

According to a fourth aspect of the present disclosure, a physical sensor for detecting a physical quantity includes: a substrate including a silicon layer, an oxide film and a support layer, which are stacked in this order; and a sensor portion includes a movable portion and a fixed portion, wherein the movable portion and the fixed portion are disposed in the silicon layer, the movable portion includes a movable electrode, which is supported by a beam on the support layer, the fixed portion includes a fixed electrode facing the movable electrode. The physical sensor detects the physical quantity along with a first direction parallel to the substrate based on a capacitance between the movable electrode and the fixed electrode. The sensor portion further includes a first sensor and a second sensor. The first sensor includes a first movable electrode having a first thickness in a second direction perpendicular to the substrate. The second sensor includes a second movable electrode having a second thickness in the second direction. The first thickness is different from the second thickness.

A distance between the movable electrode and the lower electrode can be varied for the first sensor section and the second sensor section. A value of capacitance therebetween can be varied. Multiple sensors with different sensitivities can be formed in the same substrate.

According to a fifth aspect of the present disclosure, a manufacturing method of a physical sensor for detecting a physical quantity includes: forming a lower electrode on a surface of a support layer; forming a silicon layer on the surface of the support layer via the lower electrode and an oxide film, wherein the silicon layer, the oxide film and the support layer provide a substrate; implanting an oxygen ion at a lower part of the silicon layer, wherein the lower part is disposed on an oxide film side, and an upper part of the silicon layer opposite to the lower part provides a vertical beam; performing heat treatment to the lower part of the silicon layer so that the lower part provides a sacrifice oxide film, which contacts the oxide film; forming a mask on the surface of the silicon layer, and forming an opening in the mask, wherein the opening in the mask corresponds to a movable portion and a fixed portion; etching the silicon layer through the mask so that the movable portion and the fixed portion are formed in the silicon layer; and etching the sacrifice oxide film and a part of the oxide film through an etched portion of the silicon layer in the etching the silicon layer so that the movable portion is separated from the support layer. The movable portion includes a movable electrode, which is supported by a beam on the support layer. The fixed portion includes a fixed electrode facing the movable electrode. The etching the sacrifice oxide film and the part of the oxide film provides that the movable electrode faces the lower electrode via a space without the oxide film. The physical sensor detects the physical quantity along with a first direction parallel to the substrate based on a capacitance between the movable electrode and the fixed electrode. The physical sensor detects the physical quantity along with a second direction perpendicularly to the substrate based on a capacitance between the movable electrode and the lower electrode. The beam includes the vertical beam displaceable along with the second direction and a horizontal beam displaceable along with the first direction. The vertical beam has a thickness in the second direction, and the horizontal beam has a thickness in the second direction. The etching the sacrifice oxide film and the part of the oxide film provides that the thickness of the vertical beam is different from the thickness of the horizontal beam.

After oxygen ion is injected, the heat treatment is performed to oxidize the bottom position of the silicon layer and form the sacrifice oxide film. The sacrifice oxide film is removed at the same time of removing the oxide film to form a structure with different heights. The height of the vertical beam can be individually controlled to differ from that of the horizontal beam. As mentioned above, optimal values can be individually assigned to spring characteristics of the beams. An intended interval can be provided between the movable electrode and the lower electrode.

According to a sixth aspect of the present disclosure, a manufacturing method of a physical sensor for detecting a physical quantity includes: forming a lower layer of a silicon layer on a support layer via an oxide film; patterning the lower layer so that a lower electrode is formed on a surface of the oxide film; forming an insulation film on the lower layer; patterning the insulation film so that a part of the lower electrode is exposed from the insulation film; forming an upper layer of the silicon layer on the insulation film and the part of the lower electrode, wherein the silicon layer, the oxide film and the support layer provide a substrate; implanting an oxygen ion at a lower part of the upper layer, wherein the lower part is disposed on an insulation film side, and an upper part of the upper layer opposite to the lower part provides a vertical beam; performing heat treatment to the lower part of the upper layer so that the lower part provides a sacrifice oxide film, which contacts the insulation film; forming a mask on the surface of the silicon layer, and forming an opening in the mask, wherein the opening in the mask corresponds to a movable portion and a fixed portion; etching the upper layer through the mask so that the movable portion and the fixed portion are formed in the upper layer; and etching the sacrifice oxide film and a part of the oxide film through an etched portion of the upper layer in the etching the upper layer so that the movable portion is separated from the support layer. The movable portion includes a movable electrode, which is supported by a beam on the support layer. The fixed portion includes a fixed electrode facing the movable electrode. The etching the sacrifice oxide film and the part of the oxide film provides that the movable electrode faces the lower electrode via a space without the oxide film. The physical sensor detects the physical quantity along with a first direction parallel to the substrate based on a capacitance between the movable electrode and the fixed electrode. The physical sensor detects the physical quantity along with a second direction perpendicularly to the substrate based on a capacitance between the movable electrode and the lower electrode. The beam includes the vertical beam displaceable along with the second direction and a horizontal beam displaceable along with the first direction. The vertical beam has a thickness in the second direction, and the horizontal beam has a thickness in the second direction, and the etching the sacrifice oxide film and the part of the oxide film provides that the thickness of the vertical beam is different from the thickness of the horizontal beam.

In the above method, the height of the vertical beam can be individually controlled to differ from that of the horizontal beam. As mentioned above, optimal values can be individually assigned to spring characteristics of the beams. An intended interval can be provided between the movable electrode and the lower electrode.

According to a seventh aspect of the present disclosure, a manufacturing method of a physical sensor for detecting a physical quantity includes: forming a silicon layer on a surface of a support layer via an oxide film, wherein the silicon layer, the oxide film and the support layer provide a substrate; implanting an oxygen ion at a lower part of the silicon layer, wherein the lower part is disposed on an oxide film side, and an upper part of the silicon layer opposite to the lower part provides a vertical beam; performing heat treatment to the lower part of the silicon layer so that the lower part provides a sacrifice oxide film, which contacts the oxide film; forming a mask on the surface of the silicon layer, and forming an opening in the mask, wherein the opening in the mask corresponds to a movable portion and a fixed portion; etching the silicon layer through the mask so that the movable portion and the fixed portion are formed in the silicon layer; etching the sacrifice oxide film and a part of the oxide film through an etched portion of the silicon layer in the etching the silicon layer so that the movable portion is separated from the support layer; and forming a cap over a surface of the silicon layer via a second oxide film after the etching the sacrifice oxide film and the part of the oxide film, wherein the cap covers the movable portion and the fixed portion; and forming an upper electrode, which faces the movable portion. The movable portion includes a movable electrode, which is supported by a beam on the support layer. The fixed portion includes a fixed electrode facing the movable electrode. The etching the sacrifice oxide film and the part of the oxide film provides that the movable electrode faces the lower electrode via a space without the oxide film. The physical sensor detects the physical quantity along with a first direction parallel to the substrate based on a capacitance between the movable electrode and the fixed electrode. The physical sensor detects the physical quantity along with a second direction perpendicularly to the substrate based on a capacitance between the movable electrode and the lower electrode. The beam includes the vertical beam displaceable along with the second direction and a horizontal beam displaceable along with the first direction. The vertical beam has a thickness in the second direction, and the horizontal beam has a thickness in the second direction. The etching the sacrifice oxide film and the part of the oxide film provides that the thickness of the vertical beam is different from the thickness of the horizontal beam.

In the above method, the height of the vertical beam can be individually controlled to differ from that of the horizontal beam. As mentioned above, optimal values can be individually assigned to spring characteristics of the beams. An intended interval can be provided between the movable electrode and the lower electrode.

BRIEF DESCRIPTION OF THE DRAWINGS

The above and other objects, features and advantages of the present invention will become more apparent from the following detailed description made with reference to the accompanying drawings. In the drawings:

FIG. 12A is a cross sectional view showing a fabrication process for forming a sacrifice oxide film only at the bottom of a silicon layer according to the first embodiment;

FIG. 12B is a cross sectional view showing a fabrication process for forming sacrifice oxide films at the top and bottom of a silicon layer according to the fourth embodiment;

DETAILED DESCRIPTION OF THE PREFERRED EMBODIMENTS

First Embodiment

Figure 1:
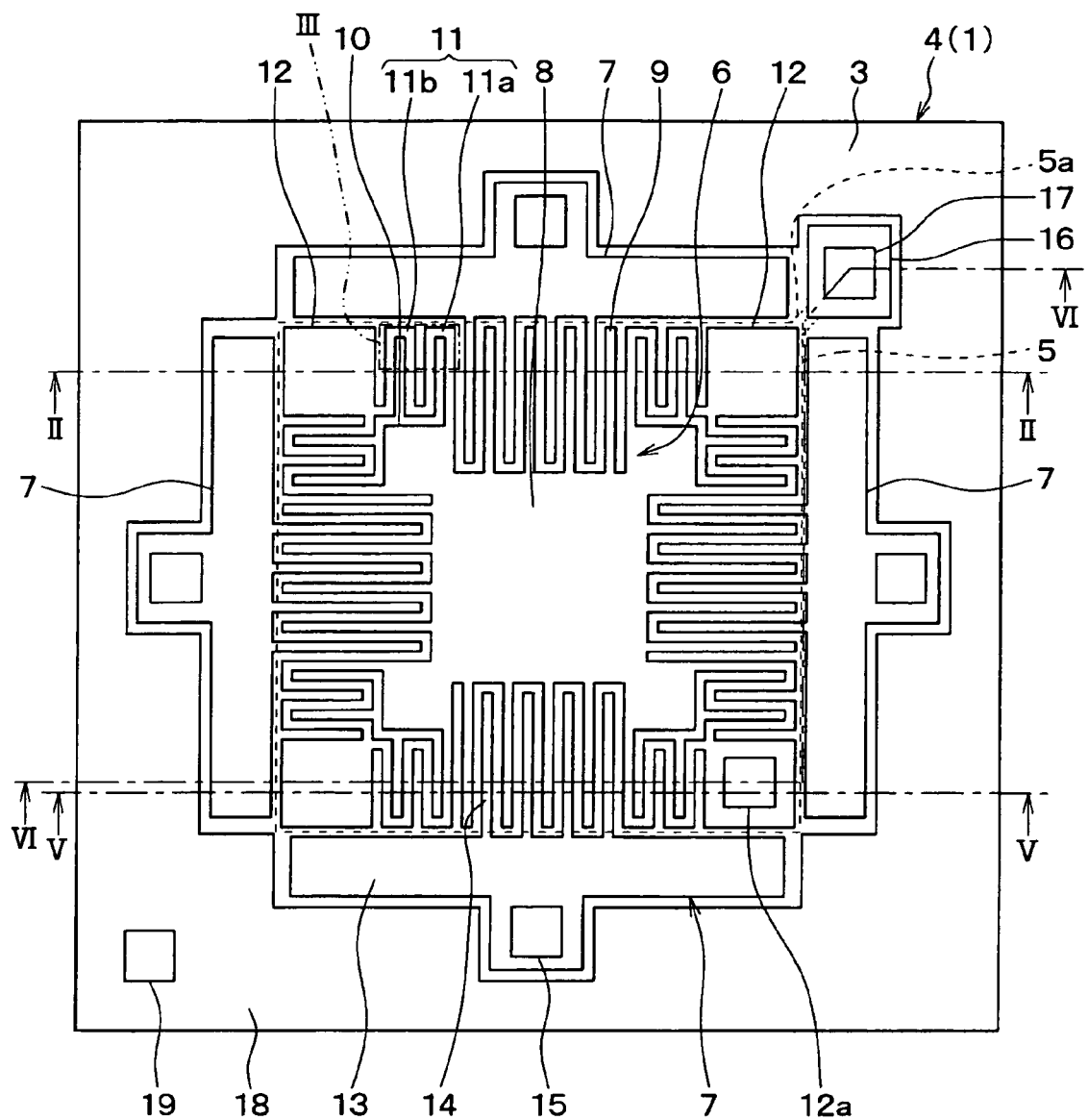
FIG. 1 is a front view of an acceleration sensor according to a first embodiment.
Figure 2:
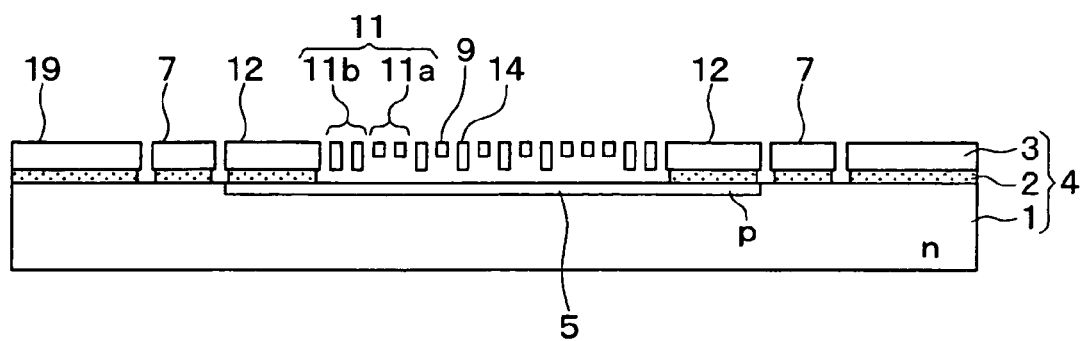
FIG. 2 is a cross sectional view taken along line II-II of FIG. 1.

The following describes a physical sensor according to the first embodiment. The embodiment represents application to a three-axis capacitance-detecting acceleration sensor that detects accelerations in three directions. FIG. 1 is a front view of the acceleration sensor according to the first embodiment. FIG. 2 is a cross sectional view taken along line II-II of FIG. 1. The acceleration sensor according to the embodiment will be described with reference to these drawings.

As shown in FIGS. 1 and 2, an SOI substrate 4 is used to form a sensor section of the acceleration sensor according to the embodiment. The SOI 4 substrate includes a support substrate 1, an embedded oxide film 2, and a silicon layer 3 that are layered in this order.

As shown in FIG. 2, the support substrate 1 is made of n-type silicon, for example. A lower electrode 5 doped with p-type impurities is formed over the surface of the support substrate 1 toward the silicon layer 3. The embedded oxide film 2 is formed to provide a specified interval between the support substrate 1 and the silicon layer 3 and is partially removed. The silicon layer 3 includes a movable section (beam structure) 6 and a fixed section 7. The movable section 6 belongs to a portion of the silicon layer 3 below which the oxide film 2 is removed. The fixed section 7 belongs to a portion of the silicon layer 3 below which the embedded oxide film 2 remains.

As shown in FIG. 1, the movable section 6 includes a spindle section 8, a movable electrode 9, a joining section 10, a beam 11, and an anchor section 12. The overall shape approximates to a square in plan view.

The spindle section 8 is approximately shaped like a square and functions as a spindle for moving the movable section 6 when an acceleration is applied.

The movable electrode 9 is provided vertically from each side of the approximate square corresponding to the spindle section 8. Each side is provided with the multiple spindle sections 8 to form a comb shape. The movable electrodes 9 are equally spaced. Each movable electrode 9 has the same width and length. As shown in FIG. 2, the movable electrode 9 is thinner than the other portions of the silicon layer 3 because the corresponding portion of the silicon layer 3 is removed toward the support substrate 1. This makes it possible to adjust an interval between the movable electrode 9 and the lower electrode 5 to an intended dimension. An intended capacitance can be generated between the movable electrode 9 and the lower electrode 5. When an acceleration is applied perpendicularly to the substrate, the acceleration can be detected based on a change in the capacitance.

The joining section 10 is provided at four corners of the spindle section 8 to join the spindle section 8 to the beam 11. According to the embodiment, each joining section 10 is approximately shaped like a square. The beam 11 is connected to an extension of two sides of the approximate square toward the spindle section 8.

The beam 11 connects the joining section 10 with the anchor section 12. The two beams 11 are used to connect each joining section 10 with each anchor section 12. Each beam 11 is bent more than once between the joining section 10 and the anchor section 12. Each beam 11 includes a vertical beam 11a and a horizontal beam 11b. The vertical beam 11a deflects perpendicularly to the substrate. The horizontal beam 11b deflects parallel to the substrate. The vertical beam 11a and the horizontal beam 11b are connected to each other. Either may be connected to the joining section 10 or the anchor section 12. In the embodiment, the vertical beam 11a connects with the joining section 10 and the horizontal beam 11b connects with the anchor section 12.

Specifically, the vertical beam 11a is bent 90 degrees from the extension of two sides of each joining section 10 so as to depart from the spindle section 8, then bent 90 degrees so as to approach the spindle section 8, and finally bent 90 degrees so as to depart from the spindle section 8. The horizontal beam 11b is bent 90 degrees from an end of the vertical beam 11a opposite the end connected to the joining section 10 so as to depart from the spindle section 8, then bent 90 degrees so as to approach the spindle section 8, and finally bent 90 degrees so as to depart from the spindle section 8.

Figure 3:
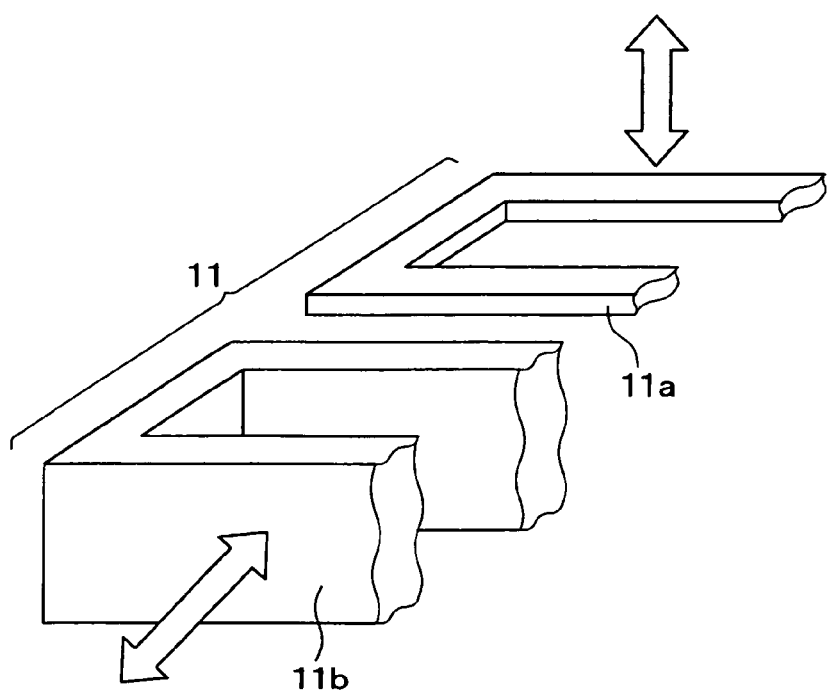
FIG. 3 is a perspective view of a portion III enclosed in a dash-double-dot line in FIG. 1.

FIG. 3 is a perspective view of a portion III enclosed in a dash-double-dot line in FIG. 1. As shown in FIG. 3, the vertical beam 11a is thinner than the horizontal beam 11b along the vertical direction with reference to the substrate and easily deflects perpendicularly to the substrate. As indicated by arrows in FIG. 3, the vertical beam 11a deflects to move the movable section 6 perpendicularly to the substrate. The horizontal beam 11b deflects to move the movable section 6 parallel to the substrate.

The anchor section 12 supports each beam 11 at one side of the anchor section 12. As shown in FIG. 2, the embedded oxide film 2 remains below the anchor section 12 to fix the anchor section 12 to the support substrate 1. The movable section 6 can move vertically and parallel to the substrate based on deflections of the beam 11 supported by the anchor section 12. A pad section 12a is formed on at least one surface of the anchor section 12. This makes it possible to acquire an electric potential for the movable section 6 when a not-shown bonding wire is used to electrically connect with the pad section 12a.

The fixed sections 7 are arranged so as to surround four sides of the movable section 6 shaped like an approximate square. There are provided four fixed sections 7 so as to correspond to the sides of the approximate square formed by the movable section 6. The fixed section 7 includes a support section 13, a fixed electrode 14, and a pad section 15.

The support section 13 is configured opposite each side of the approximate square formed by the movable section 6. The support section 13 defines a longer direction parallel to the side. As shown in FIG. 2, the embedded oxide film 2 remains below the support section 13. The support section 13 is fixed to the support substrate 1.

The fixed electrode 14 is provided vertically from a side of the support section 13 opposite the movable section 6. Each support section 13 is provided with the multiple fixed electrodes 14 to form a comb shape. The fixed electrodes 14 are equally spaced. Each fixed electrode 14 has the same width and length. The fixed electrode 14 and the movable electrode 9 are arranged opposite to each other to form a capacitance therebetween. Acceleration applied parallel to the substrate can be detected based on a change in the capacitance. The fixed electrode 14 is supported by the support section 13 and is fixed to the support substrate 1. The embedded oxide film 2 does not need to remain below the fixed electrode 14 as shown in FIG. 2.

The pad section 15 is provided on the support section 13 far from the fixed electrode 14. A metal layer is used for the surface of the pad section 15 so as to be able to electrically connect with a not-shown bonding wire. The bonding wire can be used to apply an intended electric potential. The pad section 15 is provided for each of the fixed sections 7. It is possible to apply not only the same electric potential but also different electric potentials to the fixed sections 7.

A lower electrode pad section 16 is provided for a portion of the silicon layer 3 except the movable section and the fixed section 7. The lower electrode pad section 16 applies an intended electric potential to the lower electrode 5. The lower electrode pad section 16 includes a pad 17 made of a metal layer and electrically connects with a not-show bonding wire. It is possible to apply an intended electric potential through the bonding wire. The embedded oxide film 2 remains below a portion of the lower electrode pad section 16 not corresponding to the pad 17. The embedded oxide film 2 is removed from a portion corresponding to the pad 17. As depicted by a broken line in FIG. 1, the pad 17 is electrically connected to a lead wiring 5a made of a p-type layer. An intended electric potential can be applied to the lower electrode 5.

A peripheral section 18 is the other part of the silicon layer 3 than the movable section 6, the fixed section 7, and the lower electrode pad section 16 and remains on the support substrate 1 apart from these components. A pad 19 is also formed on the peripheral section 18. The pad 19 can be electrically connected with a not-shown bonding wire to fix an electric potential such as GND electric potential.

The acceleration sensor configured as mentioned above is mounted on a vehicle as follows, for example. The vertical direction of the substrate corresponds to the vertical direction of the vehicle. One horizontal direction of the substrate corresponds to the front-back direction of the vehicle. The other perpendicular to that horizontal direction of the substrate corresponds to the left-right direction of the vehicle. Let us suppose that an acceleration is applied in the vertical, front-back, or left-right direction of the vehicle while an intended electric potential is applied to the fixed section 7 and the lower electrode 5. The result is to accordingly vary the value of capacitance between the movable electrode 9 and the fixed electrode 14 or between the movable electrode 9 and the lower electrode 5. The capacitance value variation is acquired from the pad provided for the anchor section 12 of the movable section 6. This makes it possible to detect accelerations in the vertical, front-back, and left-right directions of the vehicle.

As mentioned above, the acceleration sensor according to the embodiment uses the vertical beam 11a and the horizontal beam 11b with different thicknesses. The spring characteristic of the vertical beam 11a can differ from the spring constant of the horizontal beam 11b. An intended value can be individually assigned to the spring characteristic of each of the beams 11a and 11b. Since the silicon layer 3 is removed at the bottom toward the support substrate 1, the height of the vertical beam 11a is independent of the thickness of the embedded oxide film 2. It is possible to provide more preferable spring characteristics. An acceleration in the vertical direction of the vehicle can be detected based on deflection of the vertical beam 11a having an optimum spring characteristic. In addition, an acceleration in the front-back or left-right direction of the vehicle can be detected based on deflection of the horizontal beam 11b having an optimum spring characteristic.

In the acceleration sensor according to the embodiment, the silicon layer 3 is removed at the bottom toward the support substrate 1 so that the height of the movable electrode 9 is independent of the thickness of the embedded oxide film 2. It is possible to specify an intended distance between the movable electrode 9 and the lower electrode 5 and adjust a value of capacitance between the movable electrode 9 and the lower electrode 5.

The following describes a manufacturing method of the above-mentioned acceleration sensor according to the embodiment. FIGS. 4A to 4E are cross sectional views showing a fabrication process of the acceleration sensor in FIG. 1 and shows a fabrication process of the portion corresponding to the cross sectional view taken along line II-II in FIG. 1.

Figure 4A:
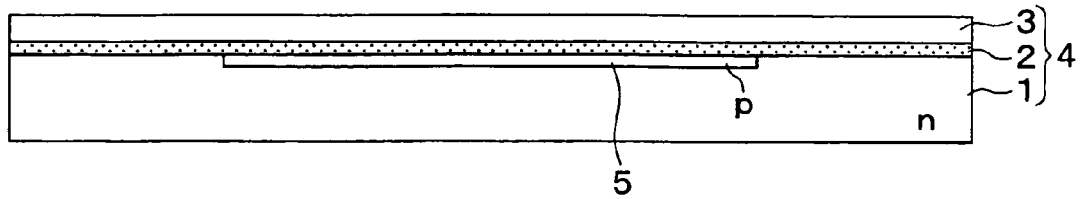
FIGS. 4A to 4E are cross sectional views showing a fabrication process of the acceleration sensor in FIG. 1 and shows a fabrication process of the portion corresponding to the cross sectional view taken along line II-II in FIG. 1.

The process in FIG. 4A first performs activation including ion injection and heat treatment on the surface of the support substrate 1 made of n-type silicon to form such patterns as the p-type lower electrode 5 and the lead wiring 5a. After the embedded oxide film 2 is formed on the surface of the support substrate 1, the silicon substrate is bonded to the surface of the embedded oxide film 2. The silicon substrate is abraded and thinned to form the silicon layer 3 and consequently the SOI substrate 4. The above-mentioned method of forming the SOI substrate 4 is just an example of various available methods. Any known technique may be used to form the SOI substrate 4. It is not always necessary to form the lower electrode 5 or the lead wiring 5a before formation of the embedded oxide film 2. The embedded oxide film 2 may be used as a through film. The ion may be injected over the embedded oxide film 2 to form the lower electrode 5 or the lead wiring 5a.

Figure 4B:
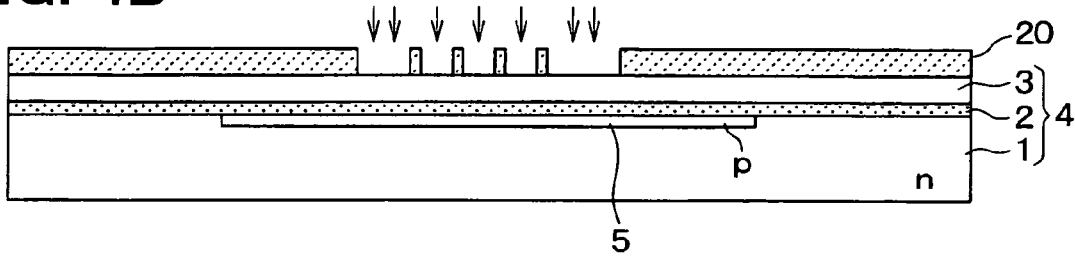
Figure 4C:
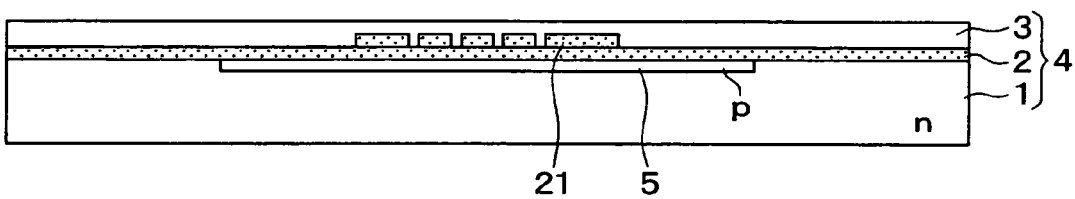

During the process as shown in FIG. 4B, a mask 20 such as resist is placed on the surface of the silicon layer 3. The mask 20 is then partly opened. Specifically, the mask 20 is opened correspondingly to the vertical beam 11a or the movable electrode 9. The mask 20 is used to inject oxygen ion. The oxygen ion is injected to the bottom of a region for forming the vertical beam 11a or the movable electrode 9. After the mask 20 is removed, the process in FIG. 4C applies heat treatment to partially oxidize the silicon layer 3 using the injected oxygen ion and form the sacrifice oxide film 21. The formed sacrifice oxide film 21 is configured to contact with the embedded oxide film 2 at the bottom of the region for forming the vertical beam 11a or the movable electrode 9.

Figure 4D:
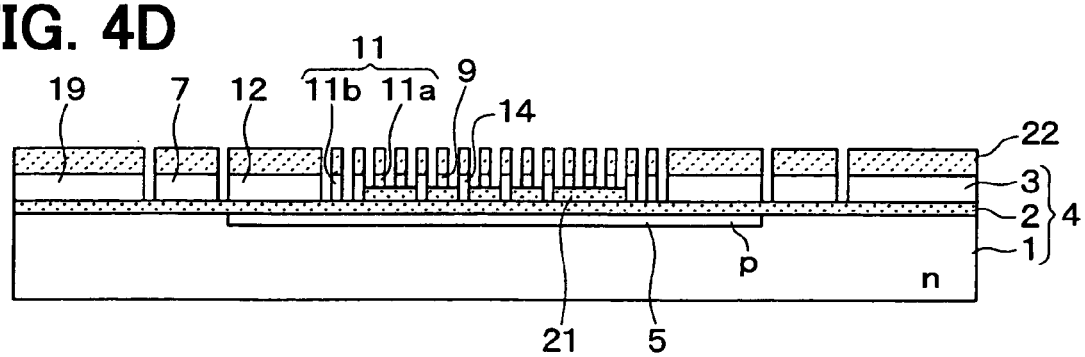

During the process in FIG. 4D, a mask 22 such as resist is placed on the surface of the silicon layer 3 and then is opened at locations other than those to be left unremoved. That is, the mask 22 is opened at locations on the silicon layer 3 by leaving only the movable section 6, the fixed section 7, the lower electrode pad section 16, and the peripheral section 18. The mask 22 is used for anisotropic etching to remove unnecessary locations from the silicon layer 3. Only the movable section 6, the fixed section 7, the lower electrode pad section 16, and the peripheral section 18 remain on the silicon layer 3.

Figure 4E:
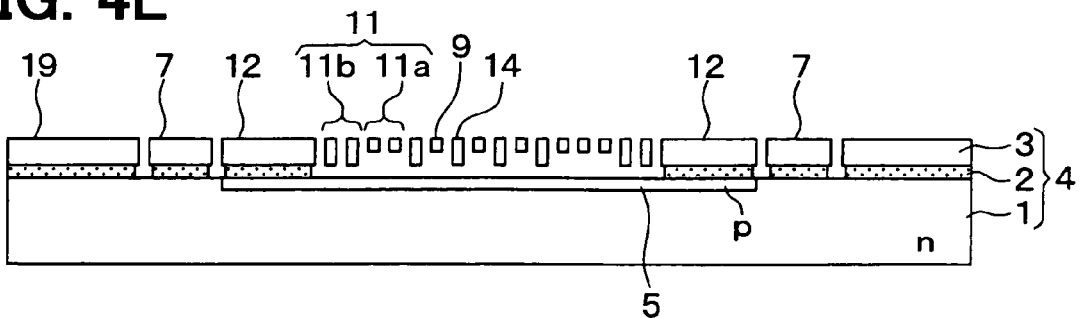

The process in FIG. 4E performs isotropic etching to remove the oxide film through the locations void of the silicon layer 3. The etching is conducted downward and laterally from the locations void of the silicon layer 3 to remove a part of the embedded oxide film 2 and a part of the sacrifice oxide film 21. The movable section 6 supported by the beam 11 floats. In this manner, the acceleration sensor structured as shown in FIG. 1 is completed.

According to the manufacturing method, the oxygen ion is injected and then the heat treatment is conducted to form the sacrifice oxide film 21 by oxidizing the bottom of the silicon layer 3. The sacrifice oxide film 21 is removed simultaneously with the embedded oxide film 2 to form a structure with different heights. It is possible to control different heights for the vertical beam 11a and the movable electrode 9 as well as the horizontal beam 11b and the fixed electrode 14 independently from each other. As mentioned above, optimal values can be individually assigned to spring characteristics of the beams 11a and 11b. An intended interval can be provided between the movable electrode 9 and the lower electrode 5.

Second Embodiment

The second embodiment will be described below. The acceleration sensor according to the embodiment includes modifications to the first embodiment such as adding a cap and changing the manufacturing method of the acceleration sensor. The basic structure of the acceleration sensor is the same as the first embodiment.

Figure 5:
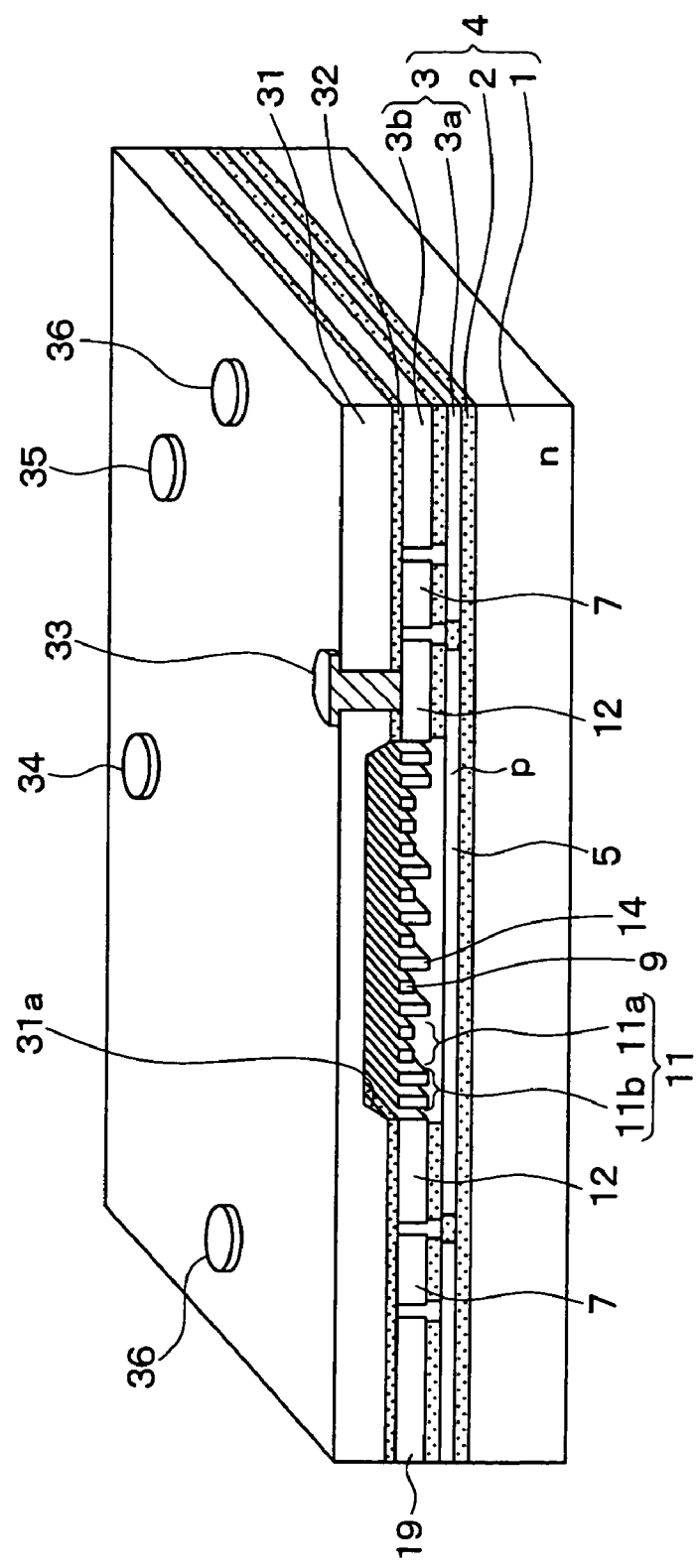
FIG. 5 is a partially cross sectional perspective view of an acceleration sensor according to a second embodiment.

FIG. 5 is a partially cross sectional perspective view of the acceleration sensor according to the embodiment. FIG. 5 is equivalent to a perspective view based on a cross sectional view taken along line V-V in FIG. 1.

As shown in FIG. 5, a cap 31 is provided on the surface of the SOI substrate 4. The cap 31 is shaped equally to the SOI substrate 4 and is made of an insulating material such as a non-doped silicon or glass substrate. The cap 31 is bonded to the SOI substrate 4 via the insulating film 32 around the outer edge of the cap 31. The cap 31 functions as a cover for the structures such as the movable section 6 and the fixed section 7 formed on the SOI substrate and as a wiring substrate for electrical connection with the pads. The insulating film 32 ensures a distance between the cap 31 and the structure such as the movable section 6 or the fixed section 7. According to the embodiment, a recess 31a is formed in the cap 31 so as to prevent the cap 31 from contacting with the structure such as the movable section 6 or the fixed section 7.

Through electrodes 33 to 36 are formed in the cap 31 at positions corresponding to the pad sections 12a, 15, and 19 and connecting to an upper electrode 30. The through electrodes 33 to 36 are electrically separated from each other because the cap 31 is made of the insulating material. The through electrodes 33 to 36 function as wirings formed in the cap 31. For example, applying wire bonding to the through electrodes 33 to 36 can provide electrical connection between the components and the outside of the sensor.

According to the embodiment, the lower electrode 5 is also made of the silicon layer 3. Specifically, the silicon layer 3 is divided into a lower layer 3a and an upper layer 3b. The lower layer 3a is previously provided for the SOI substrate 4. The upper layer 3b is formed later. The lower layer 3a provides the lower electrode 5. The upper layer 3b provides the structure such as the movable section 6 or the fixed section 7. A part of the lower electrode 5 and a part of the upper layer 3b is separated from the structure such as the movable section 6 or the fixed section 7 for a specified distance. The acceleration sensor is practically equivalent to the first embodiment.

As arranged on the surface of the SOI substrate, the cap 41 can also protect the structure such as the movable section 6 or the fixed section 7. The configuration can provide the same effect as the first embodiment. Further, the lower electrode 5 can be fabricated in the silicon layer 3.

The following describes a manufacturing method of the above-mentioned acceleration sensor according to the embodiment. FIGS. 6 and 7 are cross sectional views showing a fabrication process of the acceleration sensor in FIG. 5 and show a fabrication process of the portion corresponding to the cross sectional view taken along line VI-VI in FIG. 1.

Figure 6A:
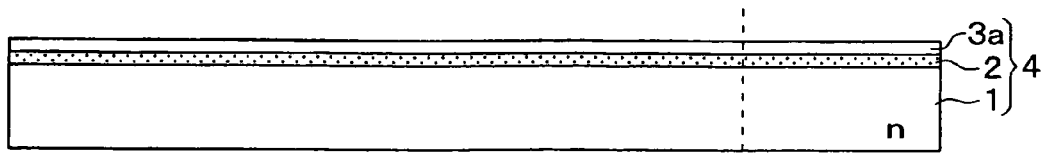
FIGS. 6A to 6E are cross sectional views showing a fabrication process of the acceleration sensor in FIG. 5 and shows a fabrication process of the portion corresponding to the cross sectional view taken along line VI-VI in FIG. 1.

The process in FIG. 6A prepares the SOI substrate 4 that includes the support substrate 1, the oxide film 2, and the lower layer 3a of the silicon layer 3. The lower layer 3a is formed on the surface of the support substrate 1 via the oxide film 2. The lower electrode 5 and the lead wiring 5a are formed in the lower layer 3a by injecting p-type impurity into the corresponding regions and conducting the heat treatment.

Figure 6B:
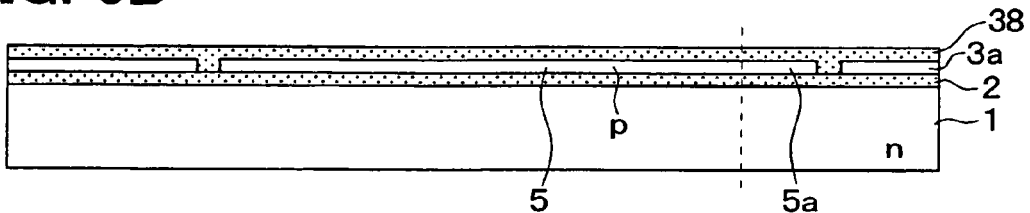
Figure 6C:
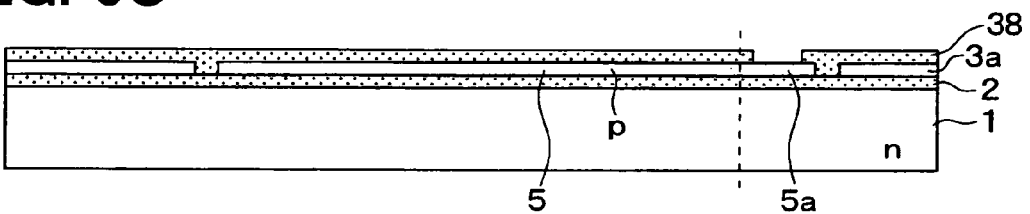
Figure 6D:
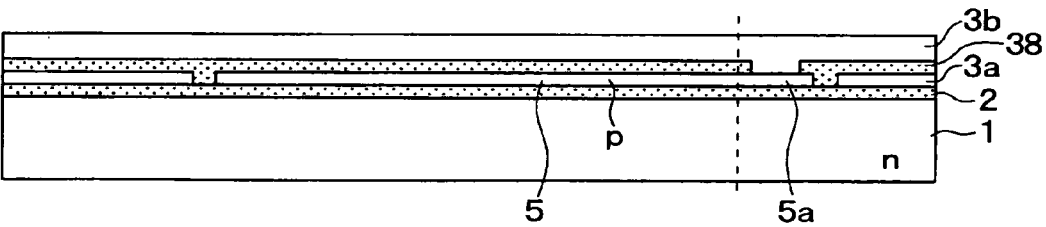

The process shown in FIG. 6B etches the lower layer 3a for patterning along outlines of the lower electrode 5 and the lead wiring 5a. The insulating film 38 is then formed on the lower layer 3a. The process shown in FIG. 6C selectively etches positions on the insulating film 38 corresponding to the lower electrode pad section 16 (pad 17) to expose the surface of the lead wiring 5a. The process shown in FIG. 6D then deposits silicon to form the upper layer 3b in the silicon layer 3. In this manner, the upper layer 3b and the lower layer 3a are connected on the surface of the lead wiring 5a.

Figure 6E:
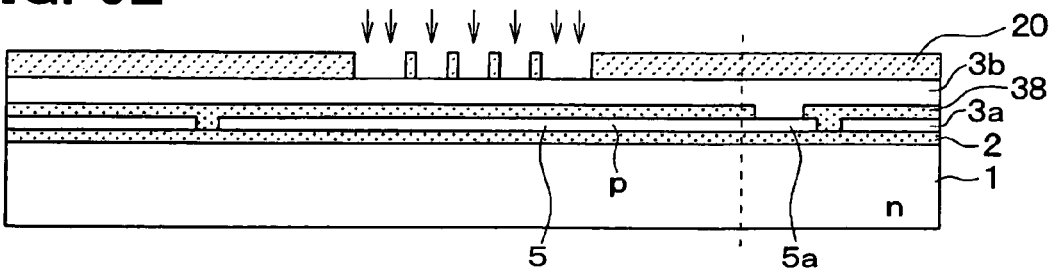

The process in FIG. 6E is the same as that in FIG. 4B. That is, oxygen ion is injected to the bottom of a region of the upper layer 3b for forming the vertical beam 11a or the movable electrode 9. Similarly to FIG. 4C, the process in FIG. 7A performs the heat treatment to partially oxidize the upper layer 3b using the oxygen ion and form the sacrifice oxide film 21. The sacrifice oxide film 21 is formed so as to contact with the insulating film 38 at the bottom of the upper layer 3b adjacent to the insulating film 38.

Figure 7A:
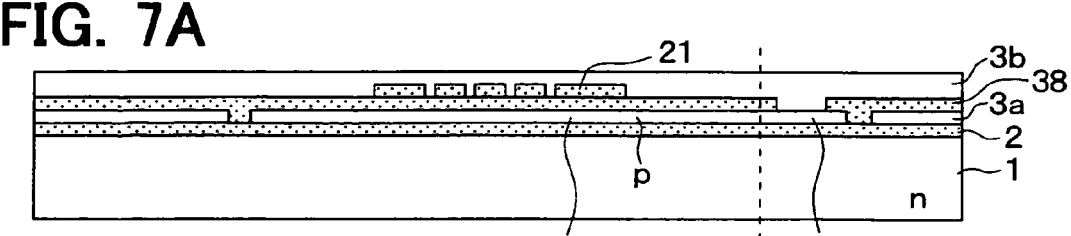
FIGS. 7A to 7E are cross sectional views showing the fabrication process of the acceleration sensor in FIG. 5 continued from FIGS. 6A to 6E.
Figure 7B:
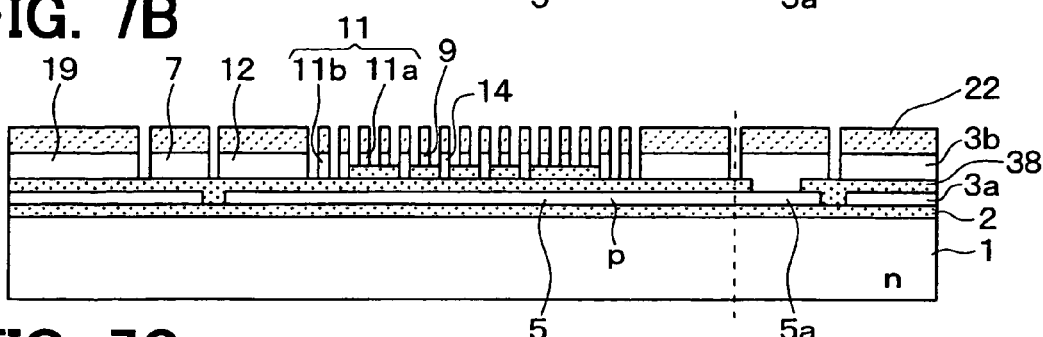
Figure 7C:
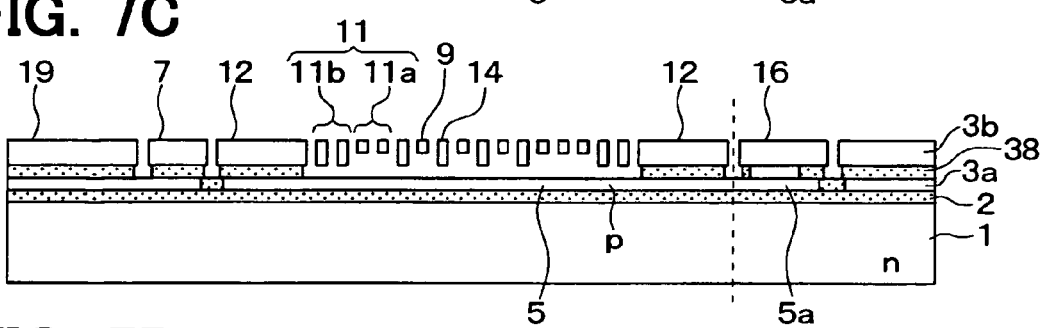

The process in FIG. 7B is the same as that in FIG. 4D. The process removes unnecessary locations from the silicon layer 3 and leaves only the movable section 6, the fixed section 7, and the peripheral section 18 of the silicon layer 3. The process in FIG. 7C is the same as that in FIG. 4E. The process removes a part of the embedded oxide film 2 and a part of the sacrifice oxide film 21. The movable section 6 supported by the beam 11 floats.

Figure 7D:
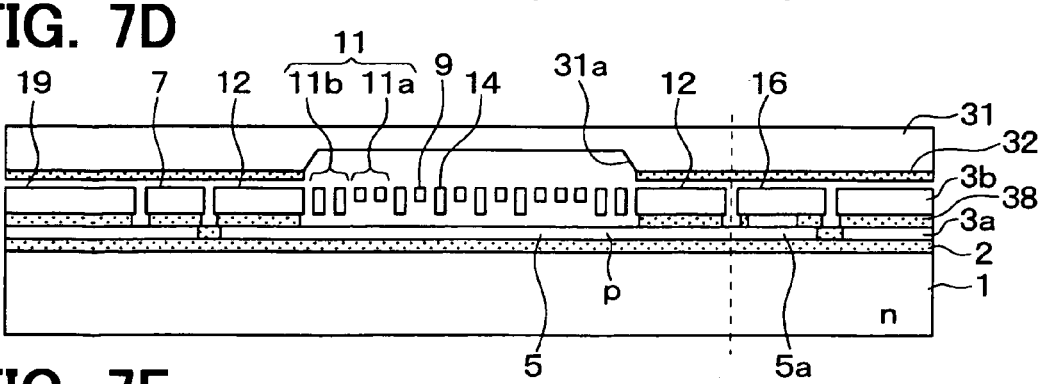

The process in FIG. 7D prepares the cap 31 where the insulating film 32 is formed. For example, the insulating film 32 is deposited on the flat cap 31. An opening is then made at a portion of the insulating film 32 where the recess 31a is to be formed. The insulating film 32 is used as a mask to selectively etch the cap 31 and form the recess 31a. The oxide film 32 is left only at the outer edge. The cap 31 is formed so as to include the recess 31a. The cap 31 is arranged on the SOI substrate 4 so that the recess 31a faces onto the structure such as the movable section 6.

Figure 7E:
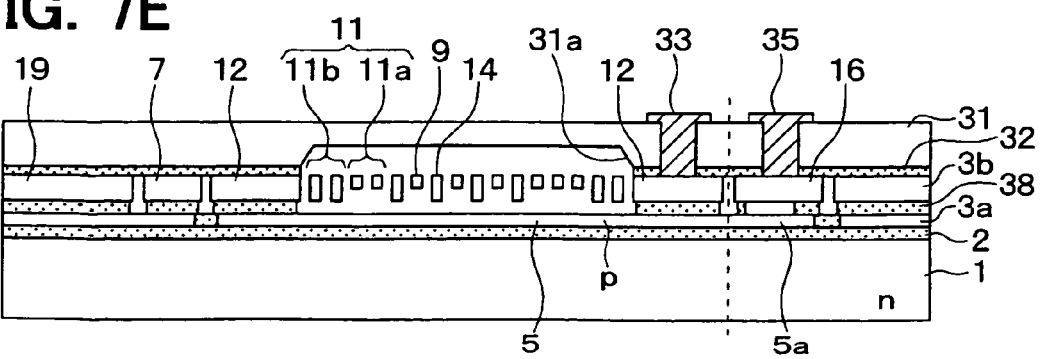

In the process shown in FIG. 7E, the oxide film 32 is bonded to the silicon layer 3 of the SOI substrate 4. A through hole is then formed at an intended position of the cap 31. A metal layer is arranged so as to embed the through hole. The metal layer is patterned to form the through electrodes 33 to 36. The acceleration sensor in FIG. 5 is completed.

Third Embodiment

The following describes the third embodiment. The acceleration sensor according to the embodiment includes modifications to the first embodiment such as changing the mode of detecting an acceleration in the vertical direction with reference to the substrate and accordingly changing the structure. The basic structure of the acceleration sensor is the same as the first embodiment.

Figure 8:
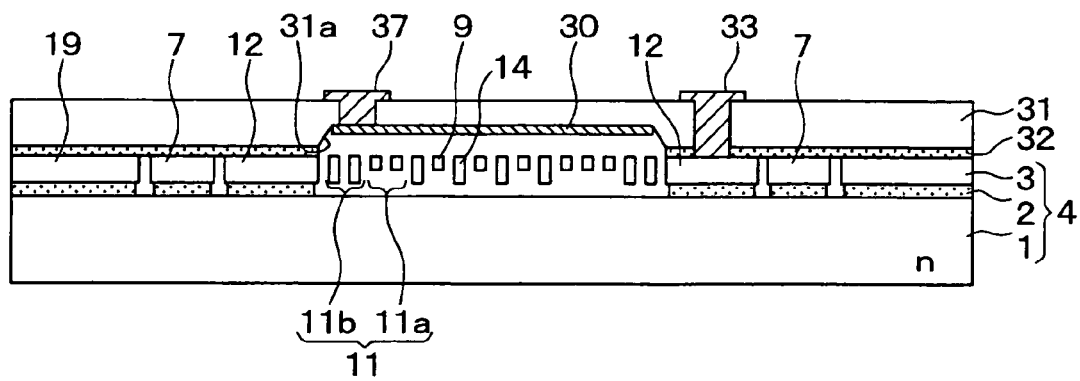
FIG. 8 is a cross sectional view showing an acceleration sensor according to a third embodiment.
Figure 9:
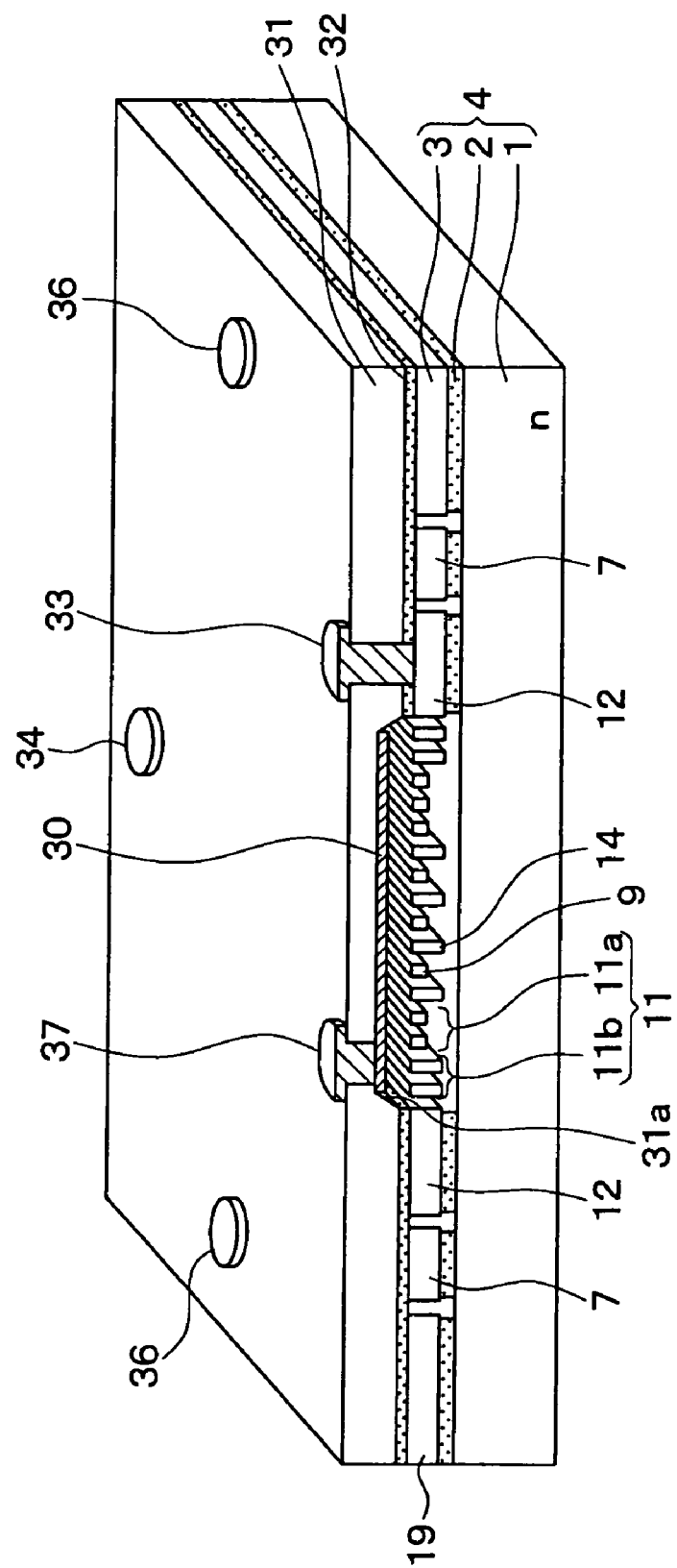
FIG. 9 is a partially cross sectional perspective view of the acceleration sensor in FIG. 8.

FIG. 8 is a cross sectional view showing an acceleration sensor according to the third embodiment. FIG. 9 is a partially cross sectional perspective view of the acceleration sensor in FIG. 8. FIG. 9 is equivalent to a perspective view based on a cross sectional view taken along line V-V in FIG. 1.

As shown in FIG. 8, the acceleration sensor according to the embodiment does not include the lower electrode 5 shown in the first embodiment but includes the upper electrode 30 instead. The upper electrode 30 is shaped equally to the SOI substrate 4 and is arranged on the surface of the cap 31 made of an insulating material. The cap 31 functions as a cover for the structures such as the movable section 6 and the fixed section 7 and as a wiring substrate for electrical connection with the upper electrode 30 and the pads. The cap 31 and the upper electrode 30 are bonded to the peripheral section 18 around the outer edge of the cap 31 via the oxide film 32 arranged on the surface of the cap 31. The cap 31 faces the movable section 6 so as to be distant from the movable electrode 9 by a specified interval at the opposite side of the support substrate 1.

The recess 31a is formed in the cap 31 at a location corresponding to the structures such as the movable section 6 and the fixed section 7. This makes it possible to ensure a longer distance between the upper electrode 30 and the movable electrode 9. Obviously, the cap 31 may have a flat surface without forming the recess 31a. In this case, the distance between the upper electrode 30 and the movable electrode 9 depends on the thickness of the oxide film 32. The oxide film 32 can be formed as thick as several micrometers and can be configured to an optimum value.

As shown in FIG. 9, through electrodes 33, 34, 36, and 37 are formed in the cap 31 at positions corresponding to the pad sections 12a, 15, and 19 and connecting to the upper electrode 30. The through electrodes 33 to 36 are electrically separated from each other because the cap 31 is made of the insulating material. The through electrodes 33 to 36 function as wirings formed in the cap 31. For example, applying wire bonding to the through electrodes 33 to 36 can provide electrical connection between the components and the outside of the sensor.

According to the embodiment, only the upper electrode 30 is formed. The lower electrode 5 described in the first embodiment is not formed. The embodiment excludes the lower electrode pad section 16 in FIG. 1. The peripheral section 18 replaces the lower electrode pad section 16, for example.

When supplied with an acceleration in the vertical direction with reference to the substrate, the acceleration sensor can detect the acceleration based on a value of the capacitance formed between the movable electrode 9 and the upper electrode 30.

The acceleration sensor according to the above-mentioned structure also allows different thicknesses for the vertical beam 11a and the horizontal beam 11b. The acceleration sensor can provide the same effect as the first embodiment.

The following describes a manufacturing method of the above-mentioned acceleration sensor according to the embodiment. FIGS. 10A to 10F are cross sectional views showing a fabrication process of the acceleration sensor in FIG. 8 and shows a fabrication process of the portion corresponding to the cross sectional view taken along line V-V in FIG. 1.

Figure 10A:
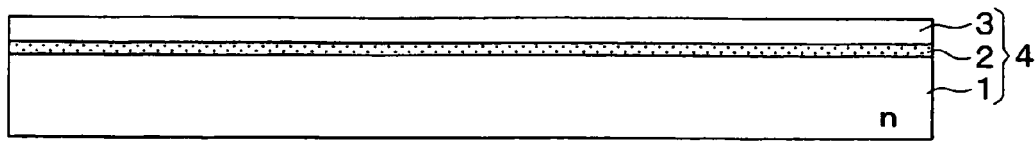
FIGS. 10A to 10F are cross sectional views showing a fabrication process of the acceleration sensor in FIG. 8.
Figure 10B:
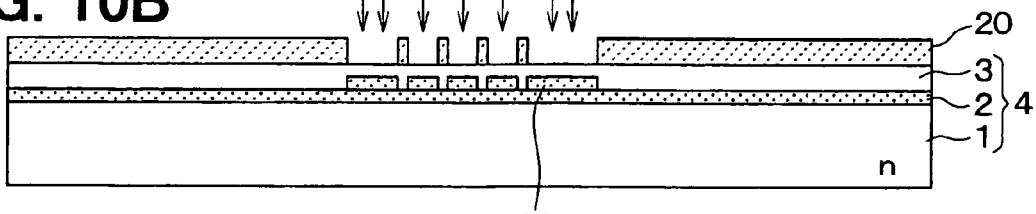
Figure 10C:
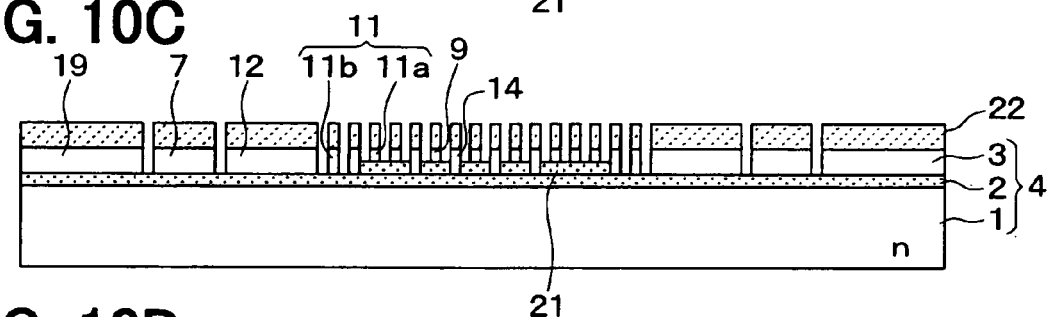
Figure 10D:
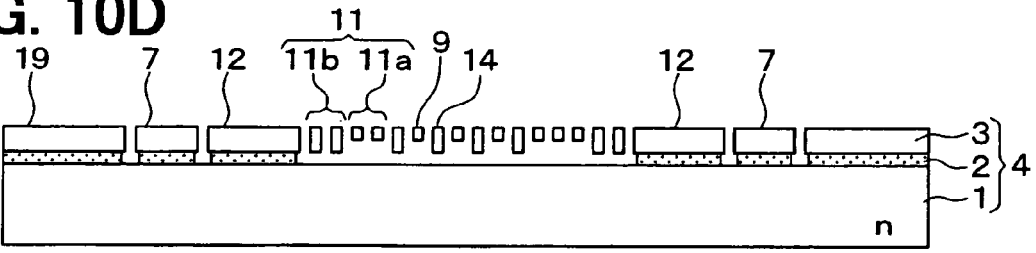

The process in FIG. 10A prepares the SOI substrate 4. The process in FIG. 10B is the same as those in FIGS. 4B and 4C as mentioned above. That is, oxygen ion is injected to the bottom of a region for forming the vertical beam 11a or the movable electrode 9. The heat treatment is conducted to partially oxidize the silicon layer 3 using the oxygen ion and form the sacrifice oxide film 21. Similarly to the process in FIG. 4D, the process in FIG. 10C removes unnecessary locations from the silicon layer 3 and leaves only the movable section 6, the fixed section 7, and the peripheral section 18 of the silicon layer 3. Similarly to the process in FIG. 4E, the process in FIG. 10D removes a part of the embedded oxide film 2 and a part of the sacrifice oxide film 21. The movable section 6 supported by the beam 11 floats.

Figure 10E:
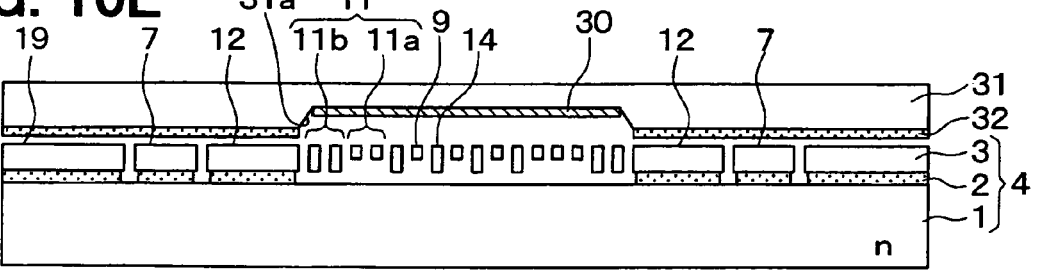

The process in FIG. 10E prepares the cap 31 where the upper electrode 30 and the insulating film 32 are formed. For example, the insulating film 32 is deposited on the flat cap 31. An opening is then made at a portion of the insulating film 32 where the recess 31a is to be formed. The insulating film 32 is used as a mask to selectively etch the cap 31 and form the recess 31a. A metal layer is placed on the surface of the cap 31 including the recess 31a and is then patterned to leave the upper electrode 30. The cap 31 can be formed so as to include the upper electrode 30 and the insulating film 32. The cap 31 is arranged on the SOI substrate 4 so that the recess 31a faces onto the structure such as the movable section 6.

Figure 10F:
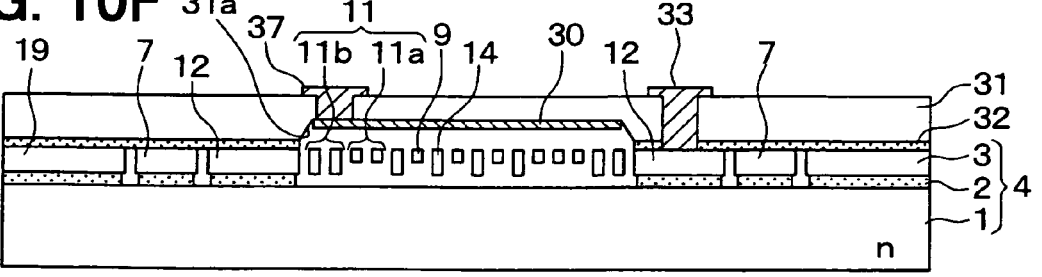

In the process shown in FIG. 10F, the oxide film 32 is bonded to the silicon layer 3 of the SOI substrate 4. A through hole is then formed at an intended position of the cap 31. The metal layer is arranged so as to embed the through hole. The metal layer is patterned to form the through electrodes 33, 34, 36, and 37. The acceleration sensor in FIG. 8 is completed.

Fourth Embodiment

The fourth embodiment will be described below. The acceleration sensor according to the embodiment includes modifications to the first embodiment such as more finely adjusting the thickness of the vertical beam 11a. The basic structure of the acceleration sensor is the same as the first embodiment.

Figure 11:
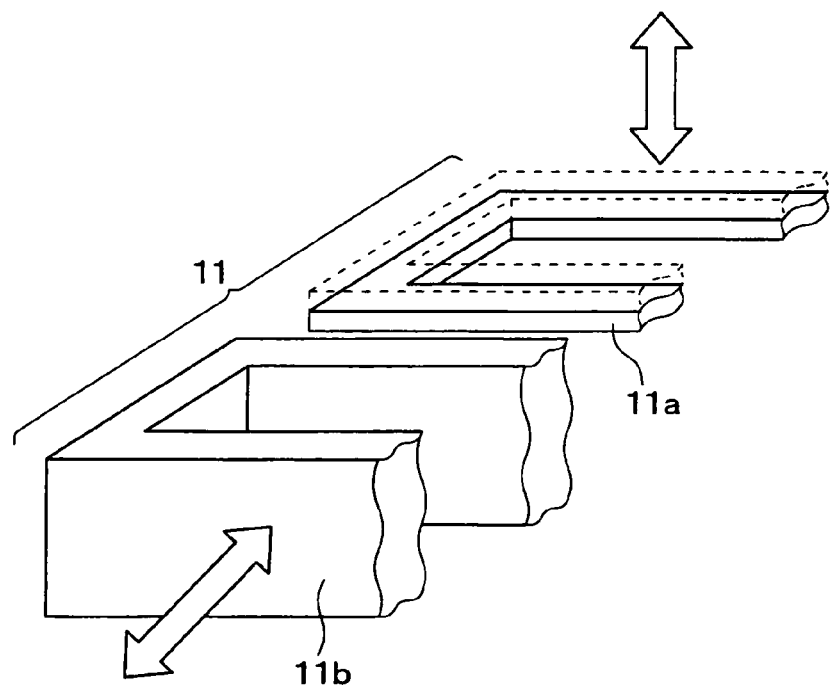
FIG. 11 is an enlarged perspective view of the beam for the acceleration sensor according to a fourth embodiment.

FIG. 11 is an enlarged perspective view of the beam for the acceleration sensor according to a fourth embodiment and is equivalent to an enlarged view of a portion enclosed in a dash-double-dot line in FIG. 1.

As shown in FIG. 11, the embodiment adjusts the thickness of the vertical beam 11a by removing not only the bottom of the silicon layer 3 but also the top thereof indicated by a broken line in FIG. 11. The vertical beam 11a can be arranged at a middle of the thickness direction for the silicon layer 3. The thickness of the vertical beam 11a is independent of the height. The spring characteristic can be controlled more finely. The acceleration sensor can be provided with the beam 11 that features more improved spring characteristic. The distance between the movable electrode 9 and the lower electrode 5 can be independent of the thickness of the movable electrode 9. The thickness and the height of the movable electrode 9 can be adjusted more appropriately.

Such acceleration sensor can be configured by varying energy for injecting the oxygen ion during the above-mentioned formation of the sacrifice oxide film 21 so as to inject the oxygen ion to the top of the silicon layer 3. FIGS. 12A and 12B diagram this process. FIG. 12A shows a process of forming a sacrifice oxide film only at the bottom of a silicon layer according to the first embodiment. FIG. 12B shows a process of forming sacrifice oxide films at the top and bottom of a silicon layer according to the fourth embodiment. FIG. 12A shows that the sacrifice oxide film 21 is formed only at the bottom of the silicon layer 3. In this case, the silicon layer 3 is removed only from the bottom where the sacrifice oxide film 21 was formed. By contrast, FIG. 12B shows that the sacrifice oxide film 21 is formed also at the top of the silicon layer 3. In this case, the silicon layer 3 is removed from the top and the bottom where the sacrifice oxide film 21 was formed. It is possible to independently adjust the thickness and the height of the vertical beam 11*a* or the movable electrode 9. A more appropriate value can be assigned.

Fifth Embodiment

The fifth embodiment will be described. The embodiment describes an acceleration sensor that includes both the lower electrode 5 and the upper electrode 30. The fifth embodiment is equivalent to the second embodiment provided with an upper electrode. Further, the fifth embodiment is equivalent to the first or fourth embodiment provided with the upper electrode 30. Further more, the fifth embodiment is equivalent to the third embodiment provided with the lower electrode 5. The basic structure of the acceleration sensor according to the fifth embodiment is the same as the second embodiment.

Figure 13:
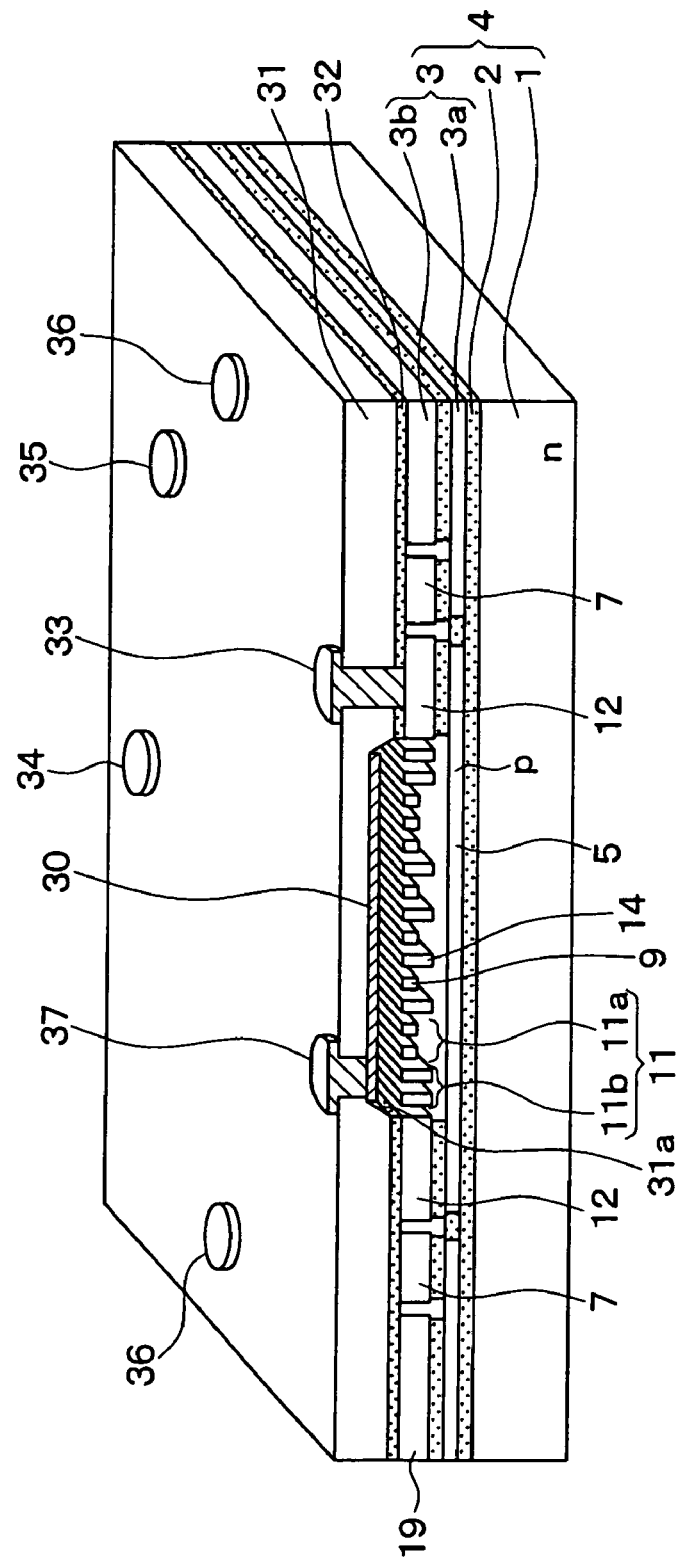
FIG. 13 is a partially cross sectional perspective view of an acceleration sensor according to a fifth embodiment.

FIG. 13 is a partially cross sectional perspective view of the acceleration sensor according to the fifth embodiment. FIG. 13 is equivalent to a perspective view based on a cross sectional view taken along line V-V in FIG. 1.

As shown in FIG. 13, the acceleration sensor according to the fifth embodiment configures the lower electrode 5 using the lower layer 3*a* of the silicon layer 3 as described in the second embodiment. The upper layer 3*b* configures the structure such as the movable section 6 or the fixed section 7. Opposite that structure, the upper electrode 30 is provided for the surface of the cap 31 as described in the third embodiment. The acceleration sensor can detect an intended acceleration based on a variation in the capacitance value based on variations in the distance between the lower electrode 5 and the movable section 6 and the distance between the upper electrode 30 and the movable section 6.

Figure 14A:
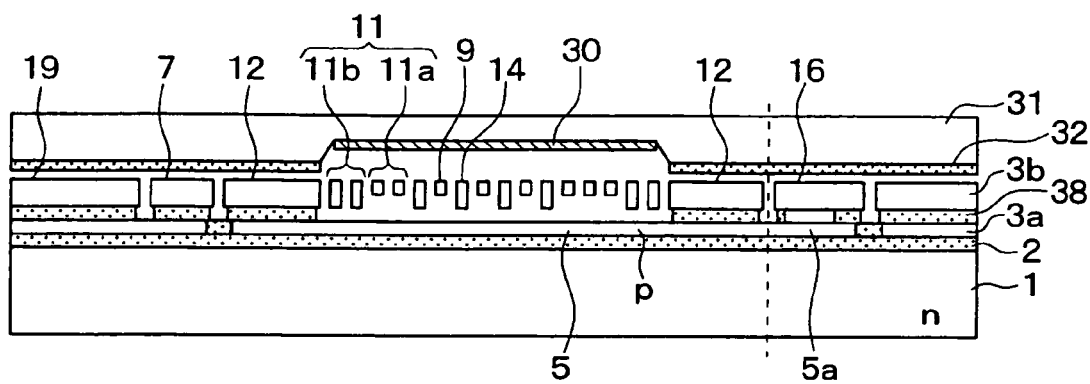
FIGS. 14A and 14B are cross sectional views showing a fabrication process of the acceleration sensor in FIG. 13 and shows a fabrication process of the portion corresponding to the cross sectional view taken along line VI-VI in FIG. 1.
Figure 14B:
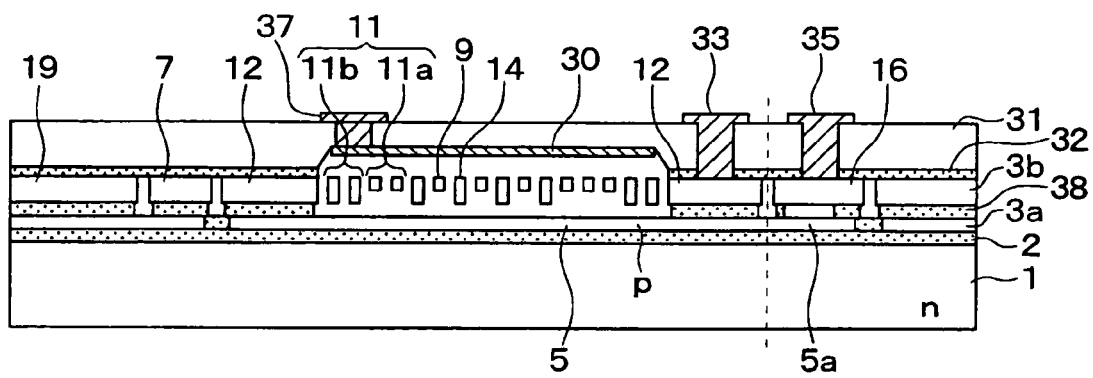

The following describes a manufacturing method of the above-mentioned acceleration sensor according to the embodiment. FIGS. 14A and 14B are cross sectional views showing a fabrication process of the acceleration sensor in FIG. 13 and shows a fabrication process of the portion corresponding to the cross sectional view taken along line VI-VI in FIG. 1. The fabrication process for the acceleration sensor according to the embodiment is almost the same as the second embodiment.

The fifth embodiment performs the processes as shown in FIGS. 6A through 6E and FIG. 7C in the second embodiment. The process in FIG. 14A then prepares the cap 31 provided with the upper electrode 30 similarly to the process in FIG. 10E according to the third embodiment. Like the process in FIG. 10F according to the third embodiment, the process in FIG. 14B forms through holes and then forms the through electrodes 33 through 37 in the through holes. The process finally completes the acceleration sensor as shown in FIG. 13 according to the embodiment.

Sixth Embodiment

Figure 15:
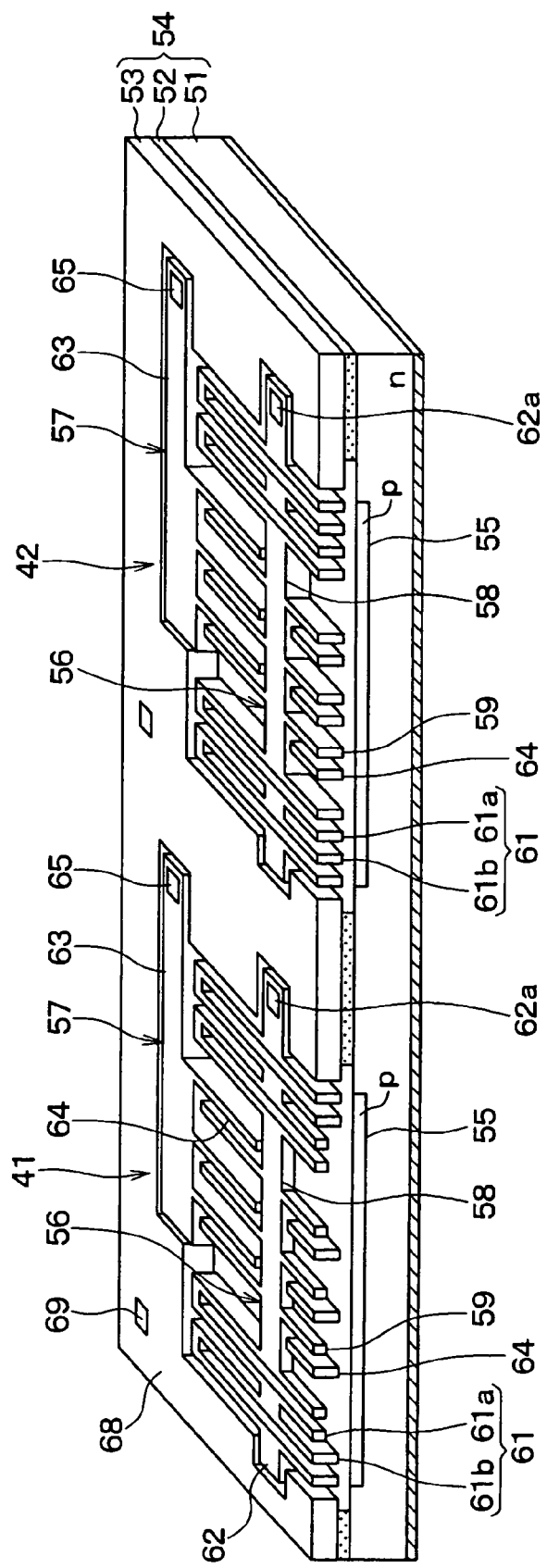
FIG. 15 is a partially cross sectional perspective view of an acceleration sensor according to a sixth embodiment.

The sixth embodiment will be described. Similarly to the first embodiment, the acceleration sensor according to the sixth embodiment detects vertical and horizontal accelerations with reference to the substrate. In addition, the sixth embodiment forms two sensor sections in the same substrate to detect an acceleration using two sensitivities. FIG. 15 shows a partially cross sectional perspective view of the acceleration sensor according to the sixth embodiment. The acceleration sensor according to the embodiment will be described with reference to FIG. 15.

As shown in FIG. 15, the embodiment also uses an SOI substrate 54 in which a silicon layer 53 is layered on a support substrate 51 via an embedded oxide film 52. A first sensor section 41 is formed to the left of the drawing. A second sensor section 42 is formed to the right of the drawing.

The support substrate 51, the embedded oxide film 52, and the silicon layer 53 function similarly to the support substrate 1, the embedded oxide film 2, and the silicon layer 3 described in the first embodiment. A lower electrode 55 and the like are formed over the surface of the support substrate 51 correspondingly to the first and second sensor sections 41 and 42. The silicon layer 53 is patterned to form sensor elements such as a movable section 56 (beam structure) and a fixed section 57 for the first and second sensor sections 41 and 42.

The movable section 56 includes a spindle section 58, a movable electrode 59, a beam 61, and an anchor section 62. The whole of the movable section 56 is shaped like an approximate square in top view. The spindle section 58, the movable electrode 59, the beam 61, and the anchor section 62 function similarly to the spindle section 8, the movable electrode 9, the beam 11, and the anchor section 12 described in the first embodiment.

The spindle section 58 is configured to be rectangular. The multiple movable electrodes 59 extend vertically from longer sides of the spindle section 58. The movable electrodes 59 have the same width and length and are equally spaced to form a comb shape. The movable electrode 59 for the first sensor section 41 is thinner than the movable electrode 59 for the second sensor section 42 along the vertical direction with reference to the substrate. Accordingly, the first and second sensor sections 41 and 42 indicate different values for the capacitance formed between the movable electrode 59 and the lower electrode 55 and the capacitance formed between the movable electrode 59 and the fixed electrode 64.

The beam 61 connects both ends of the spindle section 58 to the anchor section 62. Each beam 61 is structured by connecting two rectangular frames parallel to each other. One rectangular frame functions as a vertical beam 61*a* and the other functions as a horizontal beam 61*b*. The vertical beam 61*a* is thinner than the horizontal beam 61*b* along the vertical direction with reference to the substrate and easily deflects perpendicularly to the substrate. The vertical beam 61*a* deflects to move the movable section 56 perpendicularly to the substrate. The horizontal beam 61*b* deflects to move the movable section 6 parallel to the substrate.

The anchor section 62 supports each beam 61 at one side of the anchor section 12. The embedded oxide film 52 remains at the bottom of the anchor section 62. The anchor section 62 is fixed to the support substrate 51. Supported by the anchor section 62, the movable section 56 can move perpendicularly to and parallel to the substrate based on deflection of the beam 61. A pad 62*a* is formed on the surface of each anchor section 62. Electrically connecting a not-shown bonding wire can acquire an electric potential of the movable section 56.

One fixed section 57 is provided for each of both sides of each movable section 56. The fixed section 57 includes a support section 63, a fixed electrode 64, and a pad section 65. The support section 63 extends along a longer side of the rectangle formed by the spindle section 58. The fixed electrode 64 extends perpendicularly to a longer direction of the support section 63. The embedded oxide film 52 remains at the bottom of the support section 63. The support section 63 is fixed to the support substrate 51. Each support section 63 is provided with multiple fixed electrodes 64 to form a comb shape. The fixed electrodes 64 are equally spaced. Each fixed electrode 64 has the same width and length. The fixed electrode 64 and the movable electrode 59 are arranged opposite to each other to form a capacitance therebetween. Acceleration applied parallel to the substrate can be detected based on a change in the capacitance. The pad section 65 is provided at the end of the support section 63. A metal layer is used for the surface of the pad section 65 so as to be able to electrically connect with a not-shown bonding wire. It is possible to apply an intended electric potential through the bonding wire.

A peripheral section 68 is the other part of the silicon layer 53 than the movable section 56, the fixed section 57, and the lower electrode pad section 66 and remains on the support substrate 51 apart from these components. A pad 69 is also formed on the peripheral section 68. The pad 69 can be electrically connected with a not-shown bonding wire to fix an electric potential such as GND electric potential.

Though not shown, a lower electrode pad section is provided for a part of the silicon layer 53 except the movable section 56 and the fixed section 57. The lower electrode pad section is used to apply an intended electric potential to the lower electrode 55.

The acceleration sensor according to the embodiment is configured as mentioned above. Similarly to the first embodiment, the acceleration sensor according to the sixth embodiment also uses the vertical beam 61a and the horizontal beam 61b with different thicknesses. The spring characteristic of the vertical beam 61a can differ from the spring constant of the horizontal beam 61b. An intended value can be individually assigned to the spring characteristic of each of the beams 11a and 11b. The acceleration sensor can provide the same effect as the first embodiment.

In the acceleration sensor according to the embodiment, the movable electrode 59 is formed by removing the bottom of the silicon layer 53 toward the support substrate 51. The height of the movable electrode 59 can be independent of the thickness of the embedded oxide film 52. It is possible to specify an intended distance between the movable electrode 59 and the lower electrode 55 and adjust a value of capacitance between the movable electrode 59 and the lower electrode 55. The distance between the movable electrode 59 and the lower electrode 55 depends on the first sensor section 41 and the second sensor section 42. Different values can be assigned to the capacitances therebetween. It is possible to form sensors with different sensitivities in the same substrate.

Other Embodiments

While the above-mentioned embodiments have described the acceleration sensor as a physical sensor, the invention may be applied to an angular velocity sensor. For example, the sensor structure in FIG. 1 according to the first embodiment may detect an angular velocity in the rotation direction around a center axis of the spindle section 8 as a physical quantity parallel to the substrate.

The acceleration sensor structured according to the sixth embodiment may adjust the thickness of the movable electrode 59 or the vertical beam 61a by removing the top of the silicon layer 53 as described in the fourth embodiment.

While the sixth embodiment described an example of the acceleration sensor where the lower electrode 55 is formed, the upper electrode may be formed for the acceleration sensor as described in the third embodiment. Even when the acceleration sensor functions parallel to the substrate without forming the lower electrode 55 or the upper electrode, the thickness of the movable electrode 59 can be adjusted for the first and second sensor sections 41 and 42 independently of each other. At least it is possible to form sensors with different sensitivities in the same substrate.

The fifth embodiment describes the structure equivalent to the second embodiment provided with the upper electrode 30, that is, the structure having both the lower electrode 5 and the upper electrode 30. In addition, the first, third, fourth, and sixth embodiments may be also structured to use both the upper electrode and the lower electrode.

While the above-mentioned embodiments use the SOI substrates 4 and 54, it may be also preferable to use any substrate structured to have a silicon layer on a support substrate via an oxide film. For example, an available substrate may include an oxide film and then a silicon layer successively formed on a support substrate. Specifically, the oxide film may be deposited on the support substrate and then the silicon layer silicon layer may be layered successively.

The above-mentioned sensor structures according to the embodiments are only examples. Obviously, it may be preferable to use the other shapes having the same function, for example.

The above disclosure has the following aspects.

According to a first aspect of the present disclosure, a physical sensor for detecting a physical quantity includes: a substrate including a silicon layer, an oxide film and a support layer, which are stacked in this order; and a sensor portion includes a movable portion, a fixed portion and a lower electrode, wherein the movable portion and the fixed portion are disposed in the silicon layer, the movable portion includes a movable electrode, which is supported by a beam on the support layer, the fixed portion includes a fixed electrode facing the movable electrode, the lower electrode is disposed on the support layer, and the lower electrode faces the movable electrode via a space without the oxide film. The physical sensor detects the physical quantity along with a first direction parallel to the substrate based on a capacitance between the movable electrode and the fixed electrode. The physical sensor detects the physical quantity along with a second direction perpendicularly to the substrate based on a capacitance between the movable electrode and the lower electrode. The beam includes a vertical beam displaceable along with the second direction and a horizontal beam displaceable along with the first direction. The vertical beam has a thickness in the second direction, and the horizontal beam has a thickness in the second direction. The thickness of the vertical beam is smaller than the thickness of the horizontal beam.

The vertical beam and the horizontal beam are formed with different thicknesses. A spring characteristic of the vertical beam can differ from a spring constant of the horizontal beam. The beams can be individually assigned intended values. The height of the vertical beam is independent of the thickness of the oxide film since the silicon layer is removed at the bottom near the support substrate. The spring characteristic can be more improved. A physical quantity can be detected perpendicularly to the substrate based on deflection of the vertical beam having an improved spring characteristic. In addition, a physical quantity can be detected parallel to the substrate based on deflection of the horizontal beam having an improved spring characteristic.

Alternatively, the thickness of the vertical beam may be adjustable by removing a lower part of the vertical beam, and the lower part of the vertical beam faces the lower electrode.

According to a second aspect of the present disclosure, a physical sensor for detecting a physical quantity includes: a substrate including a silicon layer, an oxide film and a support layer, which are stacked in this order, wherein the silicon layer includes a lower layer, an insulation film and an upper layer, and the lower layer is disposed on the oxide film; and a sensor portion includes a movable portion, a fixed portion and a lower electrode, wherein the movable portion and the fixed portion are disposed in the upper layer of the silicon layer, the movable portion includes a movable electrode, which is supported by a beam on the support layer, the fixed portion includes a fixed electrode facing the movable electrode, the lower electrode is disposed on the support layer, and the lower electrode faces the movable electrode via a space without the oxide film. The physical sensor detects the physical quantity along with a first direction parallel to the substrate based on a capacitance between the movable electrode and the fixed electrode. The physical sensor detects the physical quantity along with a second direction perpendicularly to the substrate based on a capacitance between the movable electrode and the lower electrode. The beam includes a vertical beam displaceable along with the second direction and a horizontal beam displaceable along with the first direction. The vertical beam has a thickness in the second direction, and the horizontal beam has a thickness in the second direction, and the thickness of the vertical beam is smaller than the thickness of the horizontal beam.

Alternatively, the thickness of the vertical beam may be adjustable by removing a lower part of the vertical beam, and the lower part of the vertical beam faces the lower electrode. Alternatively, the sensor portion may further include an upper electrode, which is spaced apart from the movable electrode by a predetermined distance, and the upper electrode is disposed opposite to the lower electrode.

According to a third aspect of the present disclosure, a physical sensor for detecting a physical quantity includes: a substrate including a silicon layer, an oxide film and a support layer, which are stacked in this order; and a sensor portion includes a movable portion, a fixed portion and an upper electrode, wherein the movable portion and the fixed portion are disposed in the silicon layer, the movable portion includes a movable electrode, which is supported by a beam on the support layer, the fixed portion includes a fixed electrode facing the movable electrode, the upper electrode is spaced apart from the movable electrode by a predetermined distance, and the upper electrode is disposed opposite to the lower electrode. The physical sensor detects the physical quantity along with a first direction parallel to the substrate based on a capacitance between the movable electrode and the fixed electrode. The physical sensor detects the physical quantity along with a second direction perpendicularly to the substrate based on a capacitance between the movable electrode and the upper electrode. The beam includes a vertical beam displaceable along with the second direction and a horizontal beam displaceable along with the first direction. The vertical beam has a thickness in the second direction, and the horizontal beam has a thickness in the second direction, and the thickness of the vertical beam is smaller than the thickness of the horizontal beam.

Alternatively, the thickness of the vertical beam may be adjustable by removing a lower part of the vertical beam, and the lower part of the vertical beam faces the lower electrode.

Alternatively, the thickness of the vertical beam may be adjustable by removing upper and lower parts of the vertical beam, and the lower part of the vertical beam faces the lower electrode, and the upper part of the vertical beam is opposite to the lower electrode.

According to this configuration, the vertical beam can be arranged at a middle of the thickness direction for the silicon layer. The thickness of the vertical beam is independent of the height. The spring characteristic can be controlled more finely. The physical sensor can include the beam with a more improved spring characteristic.

Alternatively, the movable electrode may have a thickness in the second direction, and the fixed electrode may have a thickness in the second direction. The thickness of the movable electrode is smaller than the thickness of the fixed electrode. The thickness of the movable electrode is adjustable by removing a lower part of the movable electrode, and the lower part of the movable electrode faces the lower electrode.

The silicon layer is removed at the bottom near the support substrate so that the height of the movable electrode can be independent of the thickness of the oxide film. It is possible to specify any distance between the movable electrode and the lower electrode and adjust a value of capacitance between the movable electrode and the lower electrode as needed.

Alternatively, the sensor portion may further include a first sensor and a second sensor. The first sensor includes a first movable electrode having a first thickness in the second direction, and the second sensor includes a second movable electrode having a second thickness in the second direction. The first thickness is different from the second thickness.

According to a fourth aspect of the present disclosure, a physical sensor for detecting a physical quantity includes: a substrate including a silicon layer, an oxide film and a support layer, which are stacked in this order; and a sensor portion includes a movable portion and a fixed portion, wherein the movable portion and the fixed portion are disposed in the silicon layer, the movable portion includes a movable electrode, which is supported by a beam on the support layer, the fixed portion includes a fixed electrode facing the movable electrode. The physical sensor detects the physical quantity along with a first direction parallel to the substrate based on a capacitance between the movable electrode and the fixed electrode. The sensor portion further includes a first sensor and a second sensor. The first sensor includes a first movable electrode having a first thickness in a second direction perpendicular to the substrate. The second sensor includes a second movable electrode having a second thickness in the second direction. The first thickness is different from the second thickness.

A distance between the movable electrode and the lower electrode can be varied for the first sensor section and the second sensor section. A value of capacitance therebetween can be varied. Multiple sensors with different sensitivities can be formed in the same substrate.

Alternatively, the first thickness of the first movable electrode may be adjustable by removing a lower part of the first movable electrode, and the lower part of the first movable electrode faces the support layer.

According to a fifth aspect of the present disclosure, a manufacturing method of a physical sensor for detecting a physical quantity includes: forming a lower electrode on a surface of a support layer; forming a silicon layer on the surface of the support layer via the lower electrode and an oxide film, wherein the silicon layer, the oxide film and the support layer provide a substrate; implanting an oxygen ion at a lower part of the silicon layer, wherein the lower part is disposed on an oxide film side, and an upper part of the silicon layer opposite to the lower part provides a vertical beam; performing heat treatment to the lower part of the silicon layer so that the lower part provides a sacrifice oxide film, which contacts the oxide film; forming a mask on the surface of the silicon layer, and forming an opening in the mask, wherein the opening in the mask corresponds to a movable portion and a fixed portion; etching the silicon layer through the mask so that the movable portion and the fixed portion are formed in the silicon layer; and etching the sacrifice oxide film and a part of the oxide film through an etched portion of the silicon layer in the etching the silicon layer so that the movable portion is separated from the support layer. The movable portion includes a movable electrode, which is supported by a beam on the support layer. The fixed portion includes a fixed electrode facing the movable electrode. The etching the sacrifice oxide film and the part of the oxide film provides that the movable electrode faces the lower electrode via a space without the oxide film. The physical sensor detects the physical quantity along with a first direction parallel to the substrate based on a capacitance between the movable electrode and the fixed electrode. The physical sensor detects the physical quantity along with a second direction perpendicularly to the substrate based on a capacitance between the movable electrode and the lower electrode. The beam includes the vertical beam displaceable along with the second direction and a horizontal beam displaceable along with the first direction. The vertical beam has a thickness in the second direction, and the horizontal beam has a thickness in the second direction. The etching the sacrifice oxide film and the part of the oxide film provides that the thickness of the vertical beam is different from the thickness of the horizontal beam.

After oxygen ion is injected, the heat treatment is performed to oxidize the bottom position of the silicon layer and form the sacrifice oxide film. The sacrifice oxide film is removed at the same time of removing the oxide film to form a structure with different heights. The height of the vertical beam can be individually controlled to differ from that of the horizontal beam. As mentioned above, optimal values can be individually assigned to spring characteristics of the beams. An intended interval can be provided between the movable electrode and the lower electrode.

Alternatively, the implanting the oxygen ion may further include implanting the oxygen ion at a surface part of the silicon layer. The surface part is disposed on the upper part and opposite to the lower part, and the performing heat treatment may further include performing the heat treatment to the surface part of the silicon layer so that the surface part provides the sacrifice oxide film.

Since the sacrifice oxide film is formed at the top position of the silicon layer, the silicon layer is removed from both the top and bottom positions where the sacrifice oxide film was formed. It is possible to independently adjust the thickness and the height of the vertical beam or the movable electrode. A more appropriate value can be assigned.

According to a sixth aspect of the present disclosure, a manufacturing method of a physical sensor for detecting a physical quantity includes: forming a lower layer of a silicon layer on a support layer via an oxide film; patterning the lower layer so that a lower electrode is formed on a surface of the oxide film; forming an insulation film on the lower layer; patterning the insulation film so that a part of the lower electrode is exposed from the insulation film; forming an upper layer of the silicon layer on the insulation film and the part of the lower electrode, wherein the silicon layer, the oxide film and the support layer provide a substrate; implanting an oxygen ion at a lower part of the upper layer, wherein the lower part is disposed on an insulation film side, and an upper part of the upper layer opposite to the lower part provides a vertical beam; performing heat treatment to the lower part of the upper layer so that the lower part provides a sacrifice oxide film, which contacts the insulation film; forming a mask on the surface of the silicon layer, and forming an opening in the mask, wherein the opening in the mask corresponds to a movable portion and a fixed portion; etching the upper layer through the mask so that the movable portion and the fixed portion are formed in the upper layer; and etching the sacrifice oxide film and a part of the oxide film through an etched portion of the upper layer in the etching the upper layer so that the movable portion is separated from the support layer. The movable portion includes a movable electrode, which is supported by a beam on the support layer. The fixed portion includes a fixed electrode facing the movable electrode. The etching the sacrifice oxide film and the part of the oxide film provides that the movable electrode faces the lower electrode via a space without the oxide film. The physical sensor detects the physical quantity along with a first direction parallel to the substrate based on a capacitance between the movable electrode and the fixed electrode. The physical sensor detects the physical quantity along with a second direction perpendicularly to the substrate based on a capacitance between the movable electrode and the lower electrode. The beam includes the vertical beam displaceable along with the second direction and a horizontal beam displaceable along with the first direction. The vertical beam has a thickness in the second direction, and the horizontal beam has a thickness in the second direction, and the etching the sacrifice oxide film and the part of the oxide film provides that the thickness of the vertical beam is different from the thickness of the horizontal beam.

After oxygen ion is injected, the heat treatment is performed to oxidize the bottom position of the silicon layer and form the sacrifice oxide film. The sacrifice oxide film is removed at the same time of removing the oxide film to form a structure with different heights. The height of the vertical beam can be individually controlled to differ from that of the horizontal beam. As mentioned above, optimal values can be individually assigned to spring characteristics of the beams. An intended interval can be provided between the movable electrode and the lower electrode.

Alternatively, the manufacturing method may further include: forming a cap over a surface of the upper layer via a second oxide film after the etching the sacrifice oxide film and the part of the oxide film, wherein the cap covers the movable portion and the fixed portion; and forming first to third through holes in the cap, and forming a metal layer in each through hole so that the metal layer in the first through hole is electrically coupled with the movable portion, the metal layer in the second through hole is electrically coupled with the fixed portion, and the metal layer in the third through hole is electrically coupled with the lower electrode.

The cap can be arranged so as to cover the movable section and the fixed section. The components can be electrically connected to the outside of the sensor by forming the through electrodes for the cap.

Alternatively, the forming the cap may further include forming an upper electrode, which faces the movable portion. The forming the first to third through holes in the cap may further include forming a fourth through hole in the cap. The forming a metal layer in each through hole may further include forming the metal layer in the fourth through hole so that the metal layer in the fourth through hole is electrically coupled with the upper electrode.

According to a seventh aspect of the present disclosure, a manufacturing method of a physical sensor for detecting a physical quantity includes: forming a silicon layer on a surface of a support layer via an oxide film, wherein the silicon layer, the oxide film and the support layer provide a substrate; implanting an oxygen ion at a lower part of the silicon layer, wherein the lower part is disposed on an oxide film side, and an upper part of the silicon layer opposite to the lower part provides a vertical beam; performing heat treatment to the lower part of the silicon layer so that the lower part provides a sacrifice oxide film, which contacts the oxide film; forming a mask on the surface of the silicon layer, and forming an opening in the mask, wherein the opening in the mask corresponds to a movable portion and a fixed portion; etching the silicon layer through the mask so that the movable portion and the fixed portion are formed in the silicon layer; etching the sacrifice oxide film and a part of the oxide film through an etched portion of the silicon layer in the etching the silicon layer so that the movable portion is separated from the support layer; and forming a cap over a surface of the silicon layer via a second oxide film after the etching the sacrifice oxide film and the part of the oxide film, wherein the cap covers the movable portion and the fixed portion; and forming an upper electrode, which faces the movable portion. The movable portion includes a movable electrode, which is supported by a beam on the support layer. The fixed portion includes a fixed electrode facing the movable electrode. The etching the sacrifice oxide film and the part of the oxide film provides that the movable electrode faces the lower electrode via a space without the oxide film. The physical sensor detects the physical quantity along with a first direction parallel to the substrate based on a capacitance between the movable electrode and the fixed electrode. The physical sensor detects the physical quantity along with a second direction perpendicularly to the substrate based on a capacitance between the movable electrode and the lower electrode. The beam includes the vertical beam displaceable along with the second direction and a horizontal beam displaceable along with the first direction. The vertical beam has a thickness in the second direction, and the horizontal beam has a thickness in the second direction. The etching the sacrifice oxide film and the part of the oxide film provides that the thickness of the vertical beam is different from the thickness of the horizontal beam.

After oxygen ion is injected, the heat treatment is performed to oxidize the bottom position of the silicon layer and form the sacrifice oxide film. The sacrifice oxide film is removed at the same time of removing the oxide film to form a structure with different heights. The height of the vertical beam can be individually controlled to differ from that of the horizontal beam. As mentioned above, optimal values can be individually assigned to spring characteristics of the beams. An intended interval can be provided between the movable electrode and the lower electrode.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A physical sensor for detecting a physical quantity comprising:
   a substrate including a silicon layer, an oxide film and a support layer, which are stacked in this order; and
   a sensor portion includes a movable portion, a fixed portion and a lower electrode, wherein the movable portion and the fixed portion are disposed in the silicon layer, the movable portion includes a movable electrode, which is supported by a beam on the support layer, the fixed portion includes a fixed electrode facing the movable electrode, the lower electrode is disposed on the support layer, and the lower electrode faces the movable electrode via a space without the oxide film,
   wherein the physical sensor detects the physical quantity along with a first direction parallel to the substrate based on a capacitance between the movable electrode and the fixed electrode,
   wherein the physical sensor detects the physical quantity along with a second direction perpendicularly to the substrate based on a capacitance between the movable electrode and the lower electrode,
   wherein the beam includes a vertical beam displaceable along with the second direction and a horizontal beam displaceable along with the first direction,
   wherein the vertical beam has a thickness in the second direction, and the horizontal beam has a thickness in the second direction, and
   wherein the thickness of the vertical beam is smaller than the thickness of the horizontal beam.

2. The physical sensor of claim 1,
   wherein the thickness of the vertical beam is adjustable by removing a lower part of the vertical beam, and
   wherein the lower part of the vertical beam faces the lower electrode.

3. A physical sensor for detecting a physical quantity comprising:
   a substrate including a silicon layer, an oxide film and a support layer, which are stacked in this order, wherein the silicon layer includes a lower layer, an insulation film and an upper layer, and the lower layer is disposed on the oxide film; and
   a sensor portion includes a movable portion, a fixed portion and a lower electrode, wherein the movable portion and the fixed portion are disposed in the upper layer of the silicon layer, the movable portion includes a movable electrode, which is supported by a beam on the support layer, the fixed portion includes a fixed electrode facing the movable electrode, the lower electrode is disposed on the support layer, and the lower electrode faces the movable electrode via a space without the oxide film,
   wherein the physical sensor detects the physical quantity along with a first direction parallel to the substrate based on a capacitance between the movable electrode and the fixed electrode,
   wherein the physical sensor detects the physical quantity along with a second direction perpendicularly to the substrate based on a capacitance between the movable electrode and the lower electrode,
   wherein the beam includes a vertical beam displaceable along with the second direction and a horizontal beam displaceable along with the first direction,
   wherein the vertical beam has a thickness in the second direction, and the horizontal beam has a thickness in the second direction, and
   wherein the thickness of the vertical beam is smaller than the thickness of the horizontal beam.

4. The physical sensor of claim 3,
   wherein the thickness of the vertical beam is adjustable by removing a lower part of the vertical beam, and
   wherein the lower part of the vertical beam faces the lower electrode.

5. The physical sensor of claim 1,
   wherein the sensor portion further includes an upper electrode, which is spaced apart from the movable electrode by a predetermined distance, and
   wherein the upper electrode is disposed opposite to the lower electrode.

6. A physical sensor for detecting a physical quantity comprising:
   a substrate including a silicon layer, an oxide film and a support layer, which are stacked in this order; and
   a sensor portion including a movable portion, a fixed portion and an upper electrode, wherein the movable portion and the fixed portion are disposed in the silicon layer, the movable portion includes a movable electrode, which is supported by a beam on the support layer, the fixed portion includes a fixed electrode facing the movable electrode, the upper electrode is spaced apart from the movable electrode by a predetermined distance, and the upper electrode is disposed opposite to the support layer, wherein the physical sensor detects the physical quantity along with a first direction parallel to the substrate based on a capacitance between the movable electrode and the fixed electrode, wherein the physical sensor detects the physical quantity along with a second direction perpendicularly to the substrate based on a capacitance between the movable electrode and the upper electrode, wherein the beam includes a vertical beam displaceable along with the second direction and a horizontal beam displaceable along with the first direction, wherein the vertical beam has a thickness in the second direction, and the horizontal beam has a thickness in the second direction, and wherein the thickness of the vertical beam is smaller than the thickness of the horizontal beam.

7. The physical sensor of claim 6, wherein the thickness of the vertical beam is adjustable by removing a lower part of the vertical beam, and wherein the lower part of the vertical beam faces the lower electrode.

8. The physical sensor of claim 1, wherein the thickness of the vertical beam is adjustable by removing upper and lower parts of the vertical beam, and wherein the lower part of the vertical beam faces the lower electrode, and the upper part of the vertical beam is opposite to the lower electrode.

9. The physical sensor of claim 1, wherein the movable electrode has a thickness in the second direction, and the fixed electrode has a thickness in the second direction, wherein the thickness of the movable electrode is smaller than the thickness of the fixed electrode, wherein the thickness of the movable electrode is adjustable by removing a lower part of the movable electrode, and wherein the lower part of the movable electrode faces the lower electrode.

10. The physical sensor of claim 1, wherein the sensor portion further includes a first sensor and a second sensor, wherein the first sensor includes a first movable electrode having a first thickness in the second direction, wherein the second sensor includes a second movable electrode having a second thickness in the second direction, and wherein the first thickness is different from the second thickness.

\* \* \* \* \*